United States Patent
Lee et al.

(10) Patent No.: US 10,503,330 B2
(45) Date of Patent: Dec. 10, 2019

(54) METHOD AND ELECTRONIC DEVICE FOR OBTAINING TOUCH INPUT

(71) Applicant: Samsung Electronics Co., Ltd., Gyeonggi-do (KR)

(72) Inventors: Won Wook Lee, Gyeonggi-do (KR); Jung Kyu Kim, Gyeonggi-do (KR); Kyeong Jun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 15/609,948

(22) Filed: May 31, 2017

(65) Prior Publication Data
US 2017/0344155 A1   Nov. 30, 2017

(30) Foreign Application Priority Data
May 31, 2016   (KR) .................. 10-2016-0067677

(51) Int. Cl.
*G06F 3/044*   (2006.01)
*G06F 3/0488*   (2013.01)

(52) U.S. Cl.
CPC ............ *G06F 3/044* (2013.01); *G06F 3/0488* (2013.01); *G06F 2203/04105* (2013.01)

(58) Field of Classification Search
CPC .................. G06F 3/0418; G06F 3/044; G06F 2203/04105; G06F 2203/04106; G06F 3/0488
See application file for complete search history.

(56) References Cited

U.S. PATENT DOCUMENTS

| | | | |
|---|---|---|---|
| 9,195,343 B1* | 11/2015 | Zarraga | G01L 1/2287 |
| 2015/0049056 A1* | 2/2015 | Post | G06F 3/046 345/174 |
| 2015/0253889 A1 | 9/2015 | Hyun et al. | |
| 2016/0334935 A1 | 11/2016 | Jeon | |
| 2017/0262099 A1* | 9/2017 | Nathan | G06F 3/044 |

FOREIGN PATENT DOCUMENTS

| | | |
|---|---|---|
| KR | 1020150085650 | 7/2015 |
| KR | 1020150105005 | 9/2015 |

* cited by examiner

*Primary Examiner* — Nelson M Rosario
(74) *Attorney, Agent, or Firm* — The Farrell Law Firm, P.C.

(57) ABSTRACT

An electronic device is provided which includes a touch sensor, a pressure sensor, and a processor electrically connected with the touch sensor and the pressure sensor. The processor is configured to determine at least one of a location of a first touch sensed by the touch sensor or pressure of the first touch sensed by the pressure sensor as a user input in a first state and to determine at least one of a location of a second touch sensed by the pressure sensor or pressure of the second touch as a user input in a second state.

13 Claims, 15 Drawing Sheets

METHOD AND ELECTRONIC DEVICE FOR OBTAINING TOUCH INPUT

PRIORITY

This application claims priority under 35 U.S.C. § 119(a) to Korean Patent Application Serial No 10-2016-0067677, which was filed on May 31, 2016, in the Korean Intellectual Property Office, the entire content of which is incorporated herein by reference.

BACKGROUND

1. Field of the Disclosure

The present disclosure generally relates to an electronic device, and more particularly, to an electronic device and a method for obtaining a touch input from a user.

2. Description of the Related Art

With the development of mobile communication technologies, an electronic device equipped with a display, such as a smartphone, a wearable device, and the like has been widely adopted by users.

A display of the electronic device may be implemented with a touch screen by additionally including a touch sensor. The display implemented with the touch screen may perform a role as an input device that receives a user manipulation, in addition to a visual display device.

The electronic device may additionally support a dust-proof and/or water-proof structure to protect the electronic device. However, in the case where a conductive liquid (e.g., tap water, seawater, and the like) is placed on a surface of the touch screen, the electronic device may recognize that a touch input occurs in the whole area on which the conductive liquid is placed. In this case, the electronic device may perform an unintended operation upon receiving the touch input. In addition, an underwater touch input may be difficult to detect properly.

SUMMARY

Aspects of the present disclosure are to address at least the above-mentioned problems and/or disadvantages and to provide at least the advantages described below. Accordingly, an aspect of the present disclosure, provides a method for selecting a touch sensor based on a condition associated with a surrounding environment of an electronic device and obtaining a touch input from a user by using the selected touch sensor and the electronic device performing the same.

In accordance with an aspect of the present disclosure, an electronic device is provided which includes a touch sensor, a pressure sensor, and a processor electrically connected with the touch sensor and the pressure sensor. The processor is configured to determine at least one of a location of a first touch sensed by the touch sensor or a pressure of the first touch sensed by the pressure sensor as a user input in a first state and to determine at least one of a location of a second touch sensed by the pressure sensor or pressure of the second touch as a user input in a second state.

In accordance with an aspect of the present disclosure, an electronic device is provided which includes a first touch sensor, a second touch sensor, and a processor electrically connected with the first touch sensor and the second touch sensor. The processor is configured to determine whether a first condition or a second condition associated with a surrounding environment of the electronic device is satisfied, obtain a first touch sensed by at least one of the first touch sensor or the second touch sensor as a user input if it is determined that the first condition is satisfied, and obtain a second touch sensed by the second touch sensor as the user input if it is determined that the second condition is satisfied.

In accordance with an aspect of the present disclosure, a touch input obtaining method of an electronic device is provided which includes determining whether a first condition or a second condition associated with a surrounding environment of the electronic device is satisfied, obtaining a first touch sensed by at least one of a first touch sensor or a second touch sensor as a user input if it is determined that the first condition is satisfied, and obtaining a second touch sensed by the second touch sensor as the user input if it is determined that the second condition is satisfied.

In accordance with an aspect of the present disclosure, a computer-readable recording medium is provided which stores instructions, which when executed by a processor, determine whether a first condition or a second condition associated with a surrounding environment of the electronic device is satisfied, obtain a first touch sensed by at least one of a first touch sensor or a second touch sensor as a user input if it is determined that the first condition is satisfied, and obtain a second touch sensed by the second touch sensor as the user input if it is determined that the second condition is satisfied.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
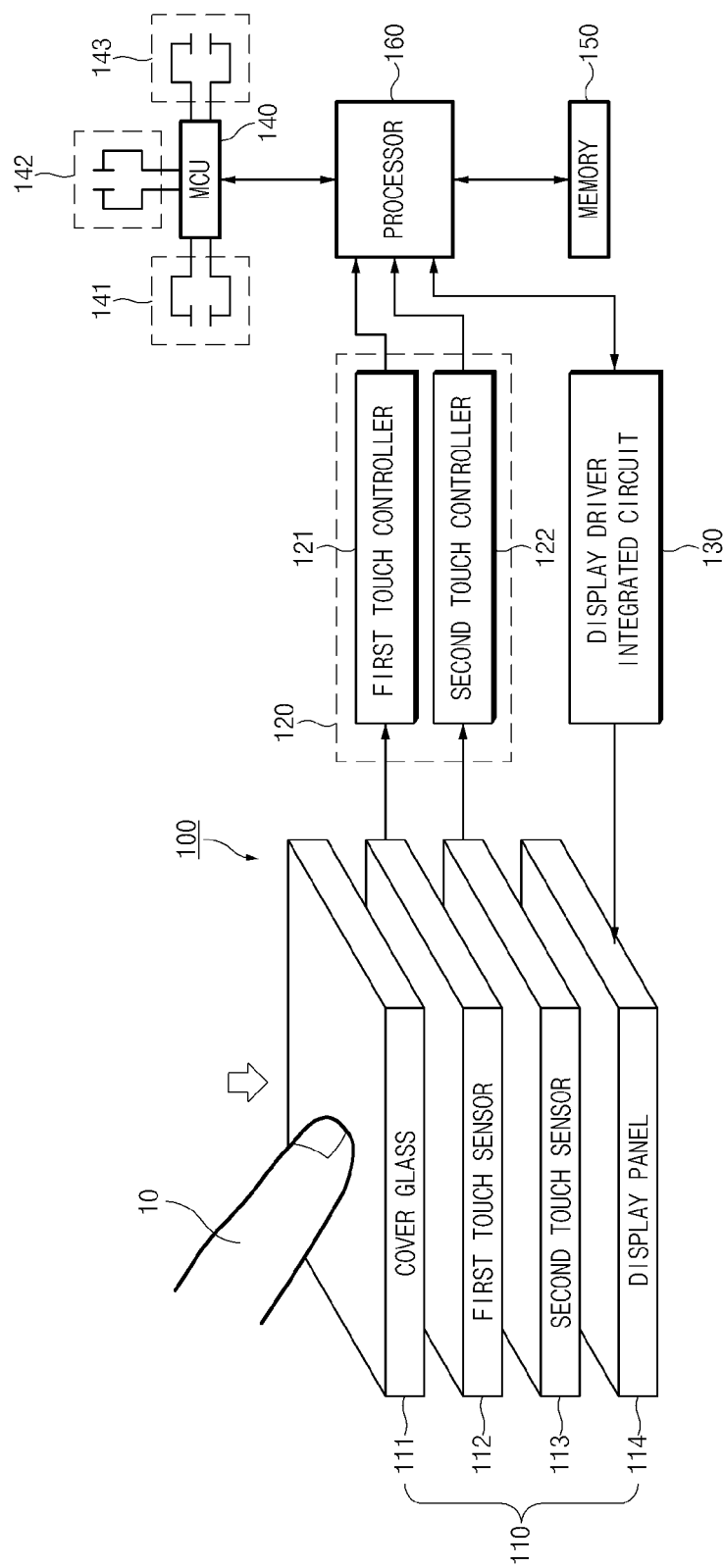
FIG. 1 is a block diagram of an electronic device, according to an embodiment of the present disclosure.

Hereinafter, certain embodiments of the present disclosure will be described with reference to the accompanying drawings. Accordingly, those skilled in the art will recognize that modifications, equivalents, and/or alternatives of embodiments described herein may be made without departing from the scope and spirit of the present disclosure. With regard to the description of the drawings, similar elements may be marked by similar reference numerals.

In the present disclosure, the expressions "have", "may have", "include" and "comprise", or "may include" and "may comprise" indicate the existence of corresponding features (e.g., elements such as numeric values, functions, operations, or components) but do not exclude the presence of additional features.

In the present disclosure, the expressions "A or B", "at least one of A or/and B", or "one or more of A or/and B", and the like may include any and all combinations of one or more of the associated listed items. The terms "A or B", "at least one of A and B", or "at least one of A or B" may refer to all of the case (1) where at least one A is included, the case (2) where at least one B is included, or the case (3) where both of at least one A and at least one B are included.

Terms, such as "first", "second", and the like, as used in the present disclosure may be used to refer to various elements regardless of the order and/or the priority and to distinguish the relevant elements from other elements, but do not limit the elements. For example, "a first user device" and "a second user device" may indicate different user devices regardless of the order or the priority. Without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" as used in the present disclosure may be used interchangeably with, for example, the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. A "processor configured to (or set to) perform A, B, and C" may mean a dedicated processor (e.g., an embedded processor) for performing a corresponding operation or a general-purpose processor (e.g., a central processing unit (CPU) or an application processor) which performs corresponding operations by executing one or more software programs which are stored in a memory device.

The terms used in the present disclosure are used to describe certain embodiments and do not limit the scope of other embodiments. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art and not in an idealized or overly formal unless expressly so defined in embodiments of the present disclosure. In some cases, even if certain terms are defined in the present disclosure, they may not be interpreted to exclude embodiments of the present disclosure.

An electronic device according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio Layer 3 (MP3) players, mobile medical devices, cameras, or wearable devices. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to an embodiment of the present disclosure, the electronic device may be a home appliance. The home appliance may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™) electronic dictionaries, electronic keys, camcorders, electronic picture frames, and the like.

According to an embodiment of the present disclosure, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sales (POS) terminals, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic device may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above-described devices or a combination thereof. An electronic device may be a flexible electronic device. Furthermore, an electronic device may not be limited to the above-described electronic devices and may include other electronic devices and new electronic devices according to the development of new technologies.

Hereinafter, electronic devices, according to an embodiment of the present disclosure, will be described with reference to the accompanying drawings. In the present disclosure, the term "user" may refer to a person who uses an electronic device or may refer to a device (e.g., an artificial intelligence electronic device) that uses the electronic device.

FIG. 1 is a block diagram of an electronic device, according to an embodiment of the present disclosure.

Referring to FIG. 1, an electronic device 100 includes a display 110, a touch controller 120, a display driver integrated circuit 130, a micro controller unit (MCU) 140, a memory 150, and a processor 160. The electronic device 100 may not include at least one of the above-described elements or may further include other elements.

The display 110 includes, for example, a cover glass 111, a first touch sensor 112, a second touch sensor 113, and a display panel 114. The cover glass 111, the first touch sensor 112, the second touch sensor 113, and the display panel 114 may have areas (e.g., substantially the same area) corresponding to each other and may be positioned to be stacked. In FIG. 1, an embodiment is illustrated as the second touch sensor 113 is positioned on an upper surface of the display panel 114 and the first touch sensor 112 is positioned on an upper surface of the second touch sensor 113. However, embodiments of the present disclosure are not limited thereto. Also, the second touch sensor 113 may have an area smaller than the display panel 114 or the first touch sensor 112, based on its shape (e.g., a module shape in which the second touch sensor 113 is positioned at least four corners).

Light generated by the display panel 114 may pass through the cover glass 111. A user may touch a portion (e.g., a finger 10) of his/her body on the cover glass 111 to perform a touch (including a contact using an electronic pen). The cover glass 111 may be formed of, for example, tempered glass, reinforced plastic, a flexible polymer material, and the like and may protect the display 110 and the electronic device 100 equipped with the display 110 from an external shock.

In the first touch sensor 112, a specified physical quantity may vary by a touch from the user. The first touch sensor 112 may include a capacitive touch sensor. In the case where a portion (e.g., the finger 10) of a user body, a stylus (an example of an electronic pen), and the like, makes contact with the cover glass 111, a coupling voltage between a transmitter and a receiver included in the first touch sensor 112 may vary. The variation in the coupling voltage may be sensed by the touch controller 120 (a first touch controller 121 of the touch controller 120). In other words, the first touch sensor 112 may sense a touch based on a coupling voltage between a transmitter and a receiver (refer to FIGS. 3A and 3B).

In the second touch sensor 113 (e.g., a pressure sensor), a specified physical quantity may vary by pressure of a touch from the user. The second touch sensor 113 may include a pressure sensitive touch sensor (or a resistive touch sensor), a piezo touch sensor, a pressure sensor (a "force sensor"), and the like. In the case where a portion (e.g., the finger 10) of a user body, a stylus (an example of an electronic pen), and the like makes contact with the cover glass 111 with specified pressure, a capacitance, a resistance, or a voltage may vary in an area in which the specific pressure is sensed, by the second touch sensor 113. The variation in capacitance, resistance, or voltage due to the pressure may be sensed by the touch controller 120 (a second touch controller 122 of the touch controller 120). In other words, the second touch sensor 113 may sense a touch based on a variation in pressure applied to the second touch sensor 113.

The display panel 114 may output content (e.g., a text, an image, a video, an icon, a widget, a symbol, and the like). The display panel 114 may include a liquid crystal display (LCD) panel, a light-emitting diode (LED) display panel, an organic LED (OLED) display panel, a microelectromechanical systems (MEMS) display panel, or an electronic paper display panel.

The touch controller 120 may sense a variation in physical quantity in the first touch sensor 112 and/or the second touch sensor 113 and may calculate a touch location (or coordinates) and/or a pressure value of the touch based on the variation in physical quantity. The calculated location (coordinates) and/or the pressure value may be provided to the processor 160 as a user input. According to an embodiment of the present disclosure, the touch controller 120 may be referred to as a "touch IC", a "touch screen IC", a "touch screen controller IC", and the like.

According to an embodiment of the present disclosure, the touch controller 120 includes the first touch controller 121 that senses a variation in physical quantity in the first touch sensor 112 and the second touch controller 122 that senses a variation in physical quantity in the second touch sensor 113. The first touch controller 121 and the second touch controller 122 may be implemented in the same integrated circuit (IC).

According to an embodiment of the present disclosure, the first touch controller 121 may sense a variation in physical quantity in the first touch sensor 112 as a touch and may report location data (e.g., coordinates) of the touch to the processor 160. The processor 160 may obtain the location data as a user input.

According to an embodiment of the present disclosure, the second touch controller 122 may sense a variation in physical quantity (e.g., capacitance, resistance, or a voltage) in the second touch sensor 113 as a touch and may report location data (e.g., coordinates) of the touch or pressure data of the touch to the processor 160. The processor 160 may obtain the location data and/or the pressure data as a user input.

In an electronic device in which the touch controller 120 is not included, the processor 160 may perform a role of the touch controller 120. Also, for example, the touch controller 120 and the processor 160 may be implemented in the same integrated circuit.

The display driver integrated circuit 130 may supply the display panel 114 with an image signal corresponding to image data received from the processor 160 (a host) at a previously determined frame rate. The display driver integrated circuit 130 may include a graphics RAM, an interface module, an image processing unit, a multiplexer, a display timing controller (T-con), a source driver, a gate driver, an oscillator, and the like.

The MCU 140 may be electrically connected with a plurality of pairs of conductive patches 141, 142, and 143 exposed to the outside of the electronic device 100. The MCU 140 may collect an impedance value detected in the plurality of pairs of conductive patches 141, 142, and 143. The MCU 140 may transmit the collected impedance value to the processor 160, or if the collected impedance value satisfies a specified condition, the MCU 140 may generate an interrupt and may transmit the interrupt to the processor 160.

According to an embodiment of the present disclosure, the MCU 140 may be implemented in an IC with power consumption lower than that of the processor 160. In this case, the MCU 140 may be configured to be always driven independently even though the processor 160 is in a sleep state.

According to an embodiment of the present disclosure, the MCU 140 may be omitted. In this case, the plurality of pairs of conductive patches 141, 142, and 143 may be directly connected with the processor 160. In this case, a function operation of the MCU 140 may be performed by at least a part of the processor 160.

The memory 150 may store commands or data associated with operations of elements included in the electronic device 100. The memory 150 may store instructions that, when executed, cause the processor 160 to perform various operations disclosed in the present specification.

The processor 160 may be electrically connected with the elements 110 to 150 included in the electronic device 100 and may execute operations or data processing associated with control and/or communication of the elements 110 to 150 included in the electronic device 100.

According to an embodiment of the present disclosure, the processor 160 may determine whether a first condition or a second condition associated with a surrounding environment of the electronic device 100 is satisfied. In the case where the first condition is satisfied, the processor 160 may determine that the electronic device 100 is in a first state. In the case where the second condition is satisfied, the processor 160 may determine that the electronic device 100 is in a second state.

Figure 6:
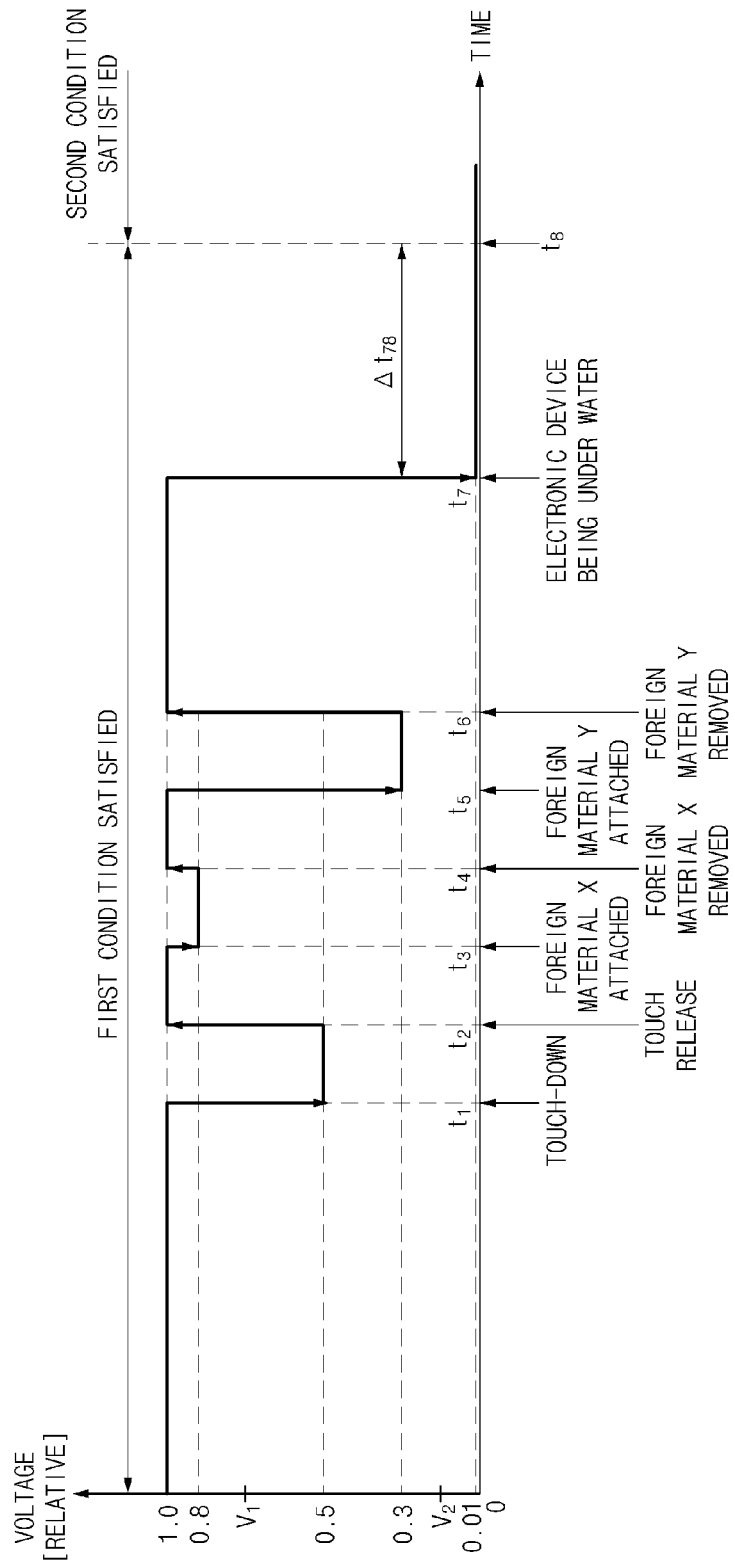
FIG. 6 illustrates how a condition associated with a surrounding environment of the electronic device is determined using the first touch sensor, according to an embodiment of the present disclosure.

The processor 160 may determine whether the first condition or the second condition is satisfied, based on a variation of a coupling voltage value of the first touch sensor 112 (referring to FIG. 6). The processor 160 may determine whether the first condition or the second condition is satisfied, based on an impedance between a pair of the conductive patches 141, 142 and 143 exposed to the outside of the electronic device 100 (refer to a relevant description of FIG. 7). The processor 160 may determine whether the first condition or the second condition is satisfied, based on impedance of a plurality of pairs of the conductive patches 141, 142, and 143 exposed to the outside of the electronic device 100 (refer to a relevant description of FIG. 8).

According to an embodiment of the present disclosure, if it is determined that the first condition is satisfied, the processor 160 may obtain a first touch sensed by at least one of the first touch sensor 112 or the second touch sensor 113 as a user input. The first touch may correspond to a touch that is made when the first condition is satisfied (e.g., in the first state). That is, in the first state, the processor 160 may obtain at least one of a location of a first touch sensed by the first touch sensor 112 or pressure of the first touch sensed by the second touch sensor 113 (e.g., a pressure sensor) as a user input.

The processor 160 may obtain the first touch sensed by the first touch sensor 112 as a user input. The processor 160 may obtain location data of the first touch through the first touch controller 121 connected with the first touch sensor 112, as a user input (touch input).

The processor 160 may obtain the first touch sensed by the second touch sensor 113 as a user input. The processor 160 may obtain location data of the first touch through the second touch controller 122 connected with the second touch sensor 113, as a user input (touch input).

The processor 160 may obtain the first touch sensed by the first touch sensor 112 and the second touch sensor 113 as a user input. The processor 160 may receive location data of the first touch through the first touch controller 121 connected with the first touch sensor 112 and may receive pressure data of the first touch through the second touch controller 122 connected with the second touch sensor 113. The processor 160 may obtain the location data and the pressure data as a user input (force touch input).

According to an embodiment of the present disclosure, if it is determined that the second condition is satisfied, the processor 160 may obtain a second touch sensed by the second touch sensor 113 as a user input. The second touch may correspond to a touch that is made when the second condition is satisfied (e.g., in the second state). That is, in the second state, the processor 160 may obtain at least one of a location of a second touch sensed by the second touch sensor 113 or pressure of the second touch as a user input.

The processor 160 may obtain location data of the second touch through the second touch controller 122 connected with the second touch sensor 113 as a user input (touch input) or may obtain location data and pressure data of the second touch as a user input (force touch input). In this case, the processor 160 may deactivate the first touch sensor 112 such that the second touch sensed from the first touch sensor 112 is not obtained as a user input.

According to an embodiment of the present disclosure, a user interface (UI) (e.g., an icon, a widget, an image, a text, a symbol, and the like) including at least one object may be output on the display panel 114. In this case, if the second condition is satisfied, the processor 160 may change at least one of a layout, a size, a shape, or a color of the at least one object. If the second condition is satisfied, under control of the processor, brightness of the display panel 114 may become higher.

The above-described operation of the processor 160 is a non-limiting example. An operation of a processor described in other parts of this specification should be understood as an operation of the processor 160. Also, in this specification, at least some of operations described as an operation of an electronic device should be understood as an operation of the processor 160.

Figure 2:
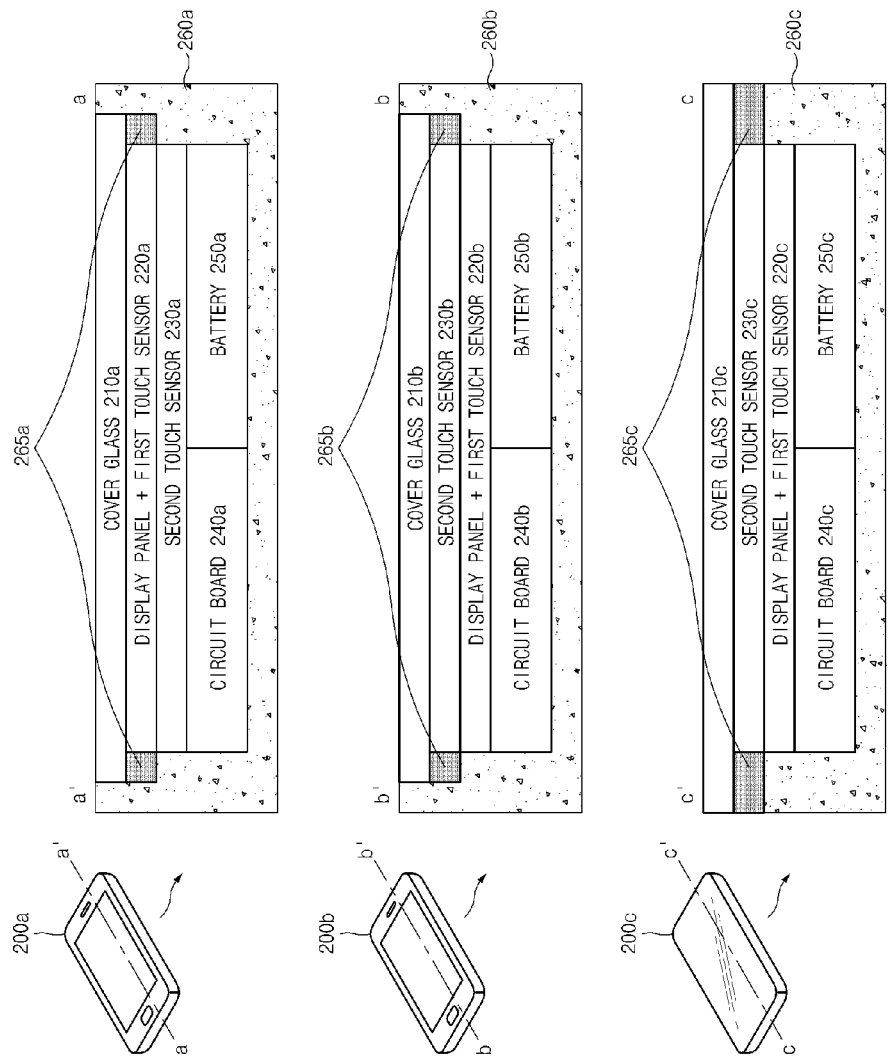
FIG. 2 is a cross sectional view illustrating a stacked structure of a display, according to an embodiment of the present disclosure.

FIG. 2 is a cross-sectional view illustrating a stacked structure of a display, according to an embodiment of the present disclosure.

Referring to FIG. 2, cross-sectional views of electronic devices 200a, 200b, and 200c, according to an embodiment of the present disclosure, are illustrated. Each of the electronic devices 200a, 200b, and 200c may correspond to the electronic device 100 illustrated in FIG. 1. A stacked structure of each of the electronic devices 200a, 200b, and 200c illustrated in FIG. 2 is an example and may be modified. For example, each of the electronic devices 200a, 200b, and 200c may not include some elements or may further include some elements (a bracket supporting an inner configuration and the like).

Referring to the cross-sectional view of the electronic device 200a, a circuit board 240a and a battery 250a may be positioned on a lower surface of a housing 260a. A second touch sensor 230 may be positioned on upper surfaces (upper ends) of the circuit board 240a and the battery 250a. A display panel and a first touch sensor may be implemented with a single panel 220a, which is positioned on an upper surface of the second touch sensor 230a (an in-cell touch sensor). A cover glass 210a may be positioned on an upper surface of the single panel 220a. The cover glass 210a may be bonded to the housing 260a with a water-proof adhesive tape 265a. External air, dust, water, and the like may be prevented from penetrating the inside of the electronic device 200a by the water-proof adhesive tape 265a.

Referring to the cross-sectional view of the electronic device 200b, like the electronic device 200a, a circuit board 240b and a battery 250b may be positioned on a lower surface of a housing 200b. A display panel and a first touch sensor may be implemented with a single panel 220b, which is positioned on upper surfaces (or upper ends) of the circuit board 240b and the battery 250b (an in-cell touch sensor). A second touch sensor 230b may be positioned on an upper surface of the single panel 220b. A cover glass 210b may be positioned on an upper surface of the second touch sensor 230b. The cover glass 210b may be bonded to the housing 260b with a water-proof adhesive tape 265b. External air, dust, water, and the like may be prevented from penetrating the inside of the electronic device 200b by the water-proof adhesive tape 265b.

According to an embodiment of the present disclosure, a front surface of an electronic device 200c may be implemented with a display. In this case, referring to the cross-sectional view of the electronic device 200c, a circuit board 240c and a battery 250c may be positioned on a lower surface of a housing 200c. A display panel and a first touch sensor may be implemented with a single panel 220c, which is positioned on upper surfaces (or upper ends) of the circuit board 240c and the battery 250c. A second touch sensor 230c may be positioned on an upper surface of the single panel 220c. A cover glass 210c may be positioned on an upper surface of the second touch sensor 230c. The cover glass 210c may be bonded to the housing 260c with a water-proof adhesive tape 265c. External air, dust, water, and the like may be prevented from penetrating the inside of the electronic device 200c by the water-proof adhesive tape 265c.

According to an embodiment of the present disclosure, at least one of the cover glass 210a, 210b, or 210c, the panel 220a, 220b, or 220c in which a first touch sensor and a display panel are combined, and the second touch sensor 230a, 230b, or 230c may be bonded to any other configuration with an optical clean adhesive (OCA).

According to an embodiment of the present disclosure, the first touch sensor may be directly formed on a back surface of the cover glass 210a, 210b or 210c (a touch sensor integrated with cover glass), may be inserted between the cover glass 210a, 210b or 210c and the display panel after being separately manufactured (an add-on touch sensor), or may be directly formed on the display panel (an on-cell touch sensor).

The second touch sensor 230a, 230b, and 230c may be positioned on the same layer of the first touch sensor or may be included inside the display panel. Also, the second touch sensor 230a, 230b or 230c is illustrated in FIG. 2 as being formed of one layer. However, for example, the second touch sensor 230a, 230b or 230c may be implemented with a plurality of sensor modules that are arranged in a module array shape and may be positioned on a back surface of the display panel or the cover glass 210a, 210b or 210c.

According to an embodiment of the present disclosure, the display panel and the first touch sensor may be implemented with separate panels, respectively. Also, the display panel and the second touch sensor may be implemented with one panel. Alternatively, the first touch sensor and the second touch sensor may be also implemented with one panel. The display panel, the first touch sensor, and the second touch sensor may be transparent or opaque and may be stacked according to various orders without being limited to the electronic devices 200a, 200b and 200c illustrated in FIG. 2.

Figure 3A:
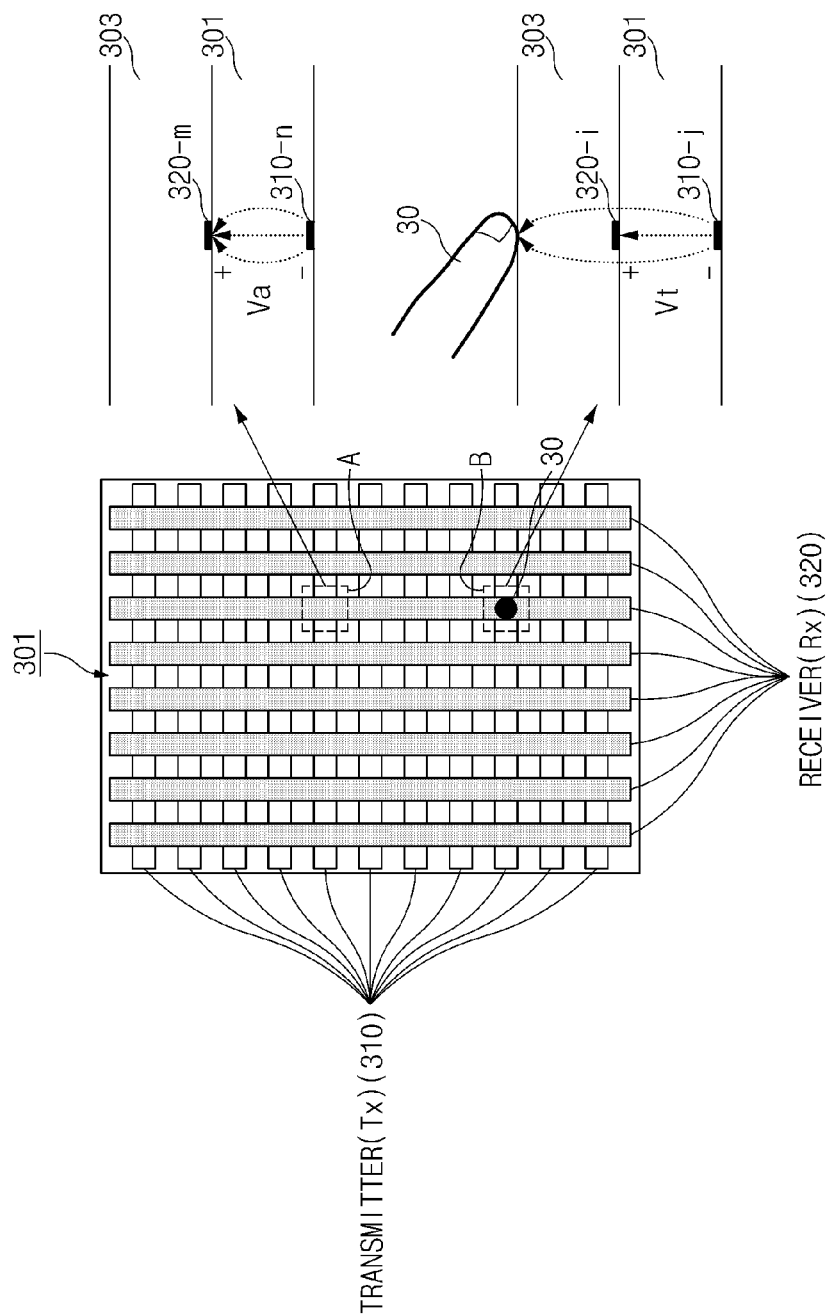
FIGS. 3A and 3B illustrate an operation of a first touch sensor, according to an embodiment of the present disclosure.
Figure 3B:
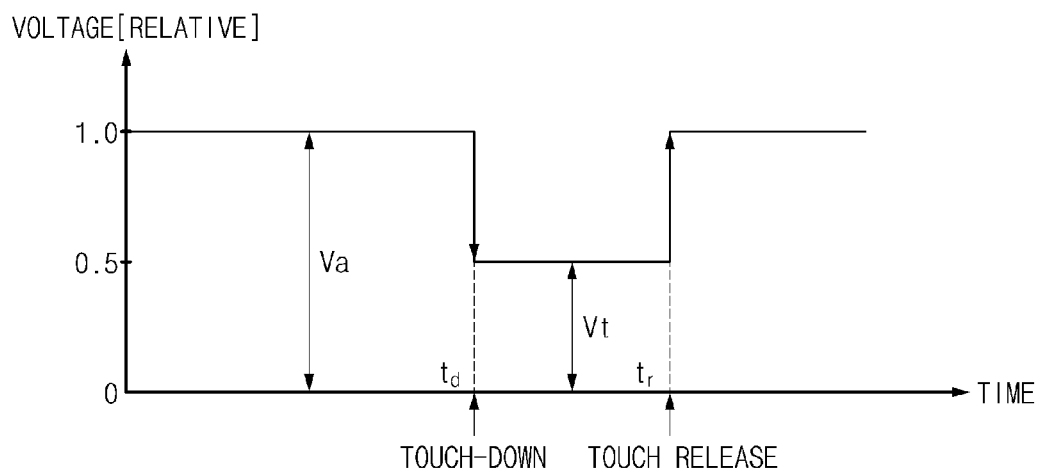

FIGS. 3A and 3B illustrate an operation of a first touch sensor, according to an embodiment of the present disclosure.

Referring to FIG. 3A, a first touch sensor 301 mountable in an electronic device is shown. Various types of touch sensors may be used as the first touch sensor 301. However, it is assumed that the first touch sensor 301 is a capacitive touch sensor.

According to an embodiment of the present disclosure, the first touch sensor 301 may include a transmitter (Tx) 310 and a receiver (Rx) 320. The transmitter (Tx) 310 may be positioned under the receiver (Rx) 320 in a horizontal direction. The receiver (Rx) 320 positioned in a vertical direction may form a lattice shape with the transmitter (Tx) 310.

According to an embodiment of the present disclosure, under control of a touch controller, the transmitter (Tx) 310 may transmit a pulse signal to the receiver (Rx) 320. When the pulse signal transmitted from the transmitter (Tx) 310 is received by the receiver (Rx) 320, a coupling voltage may be induced.

In the case where a user touch is not made at an area "A" in which an n-th transmitter 310-$n$ and an m-th receiver 320-$m$ cross each other, a significant portion (e.g., all) of a pulse signal transmitted from the n-th transmitter 310-$n$ may be received by the receiver 320-$m$. In this case, a coupling voltage Va (e.g., about 1.0 V) may be induced between the n-th transmitter 310-$n$ and the m-th receiver 320-$m$. The induced coupling voltage Va may be sensed by the touch controller.

In the case where a user touch is made at an area "B", in which a j-th transmitter 310-$j$ and an i-th receiver 320-$i$ cross each other, of the entire surface of the cover glass 303, a portion of a pulse signal transmitted from the j-th transmitter 310-$j$ may be induced (or leaked) to a finger 30 of the user (or a stylus). Accordingly, a portion of the pulse signal, which is not induced to the finger 30, may be received by the i-th receiver 320-$i$. Since only a portion of the transmitted pulse signal is received by the i-th receiver 320-$i$, a coupling voltage Vt (e.g., about 0.5V) between the j-th transmitter 310-$j$ and the i-th receiver 320-$i$ may be less than the coupling Va (e.g., about 1.0V). The touch controller may sense whether a user touch is made, by sensing that the coupling voltage Va decreases to the coupling voltage Vt.

FIG. 3B illustrates a coupling voltage graph according to whether a user touch is made. In the case where a portion (e.g., a finger) of a user body does not make contact with a cover glass, a coupling voltage of a first touch sensor may be 1.0V. The touch controller may sense that the user touch is not made, from the coupling voltage Va.

If a touch-down is made by the user at a time point $t_d$, the coupling voltage Vt of the first touch sensor may be 0.5V. The touch controller may recognize a decrease in a coupling voltage to sense that the user touch is made. Also, if the user touch is released at a time point $t_r$, the coupling voltage Va of the first touch sensor may be 1.0V. That is, the touch controller may recognize a return of a coupling voltage from 0.5V to 1.0V to sense that the user touch is released.

Figure 4A:
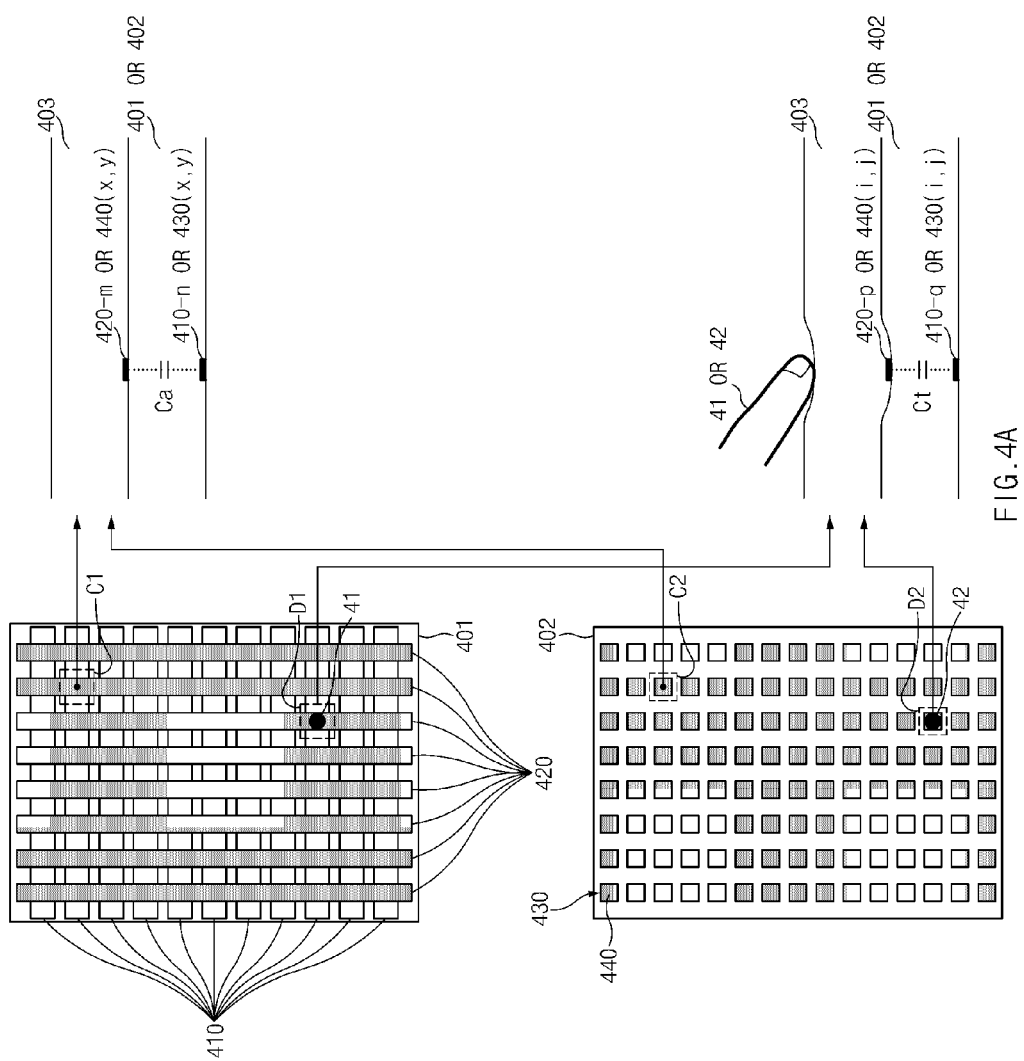
FIGS. 4A and 4B illustrate an operation of a second touch sensor, according to an embodiment of the present disclosure.
Figure 4B:
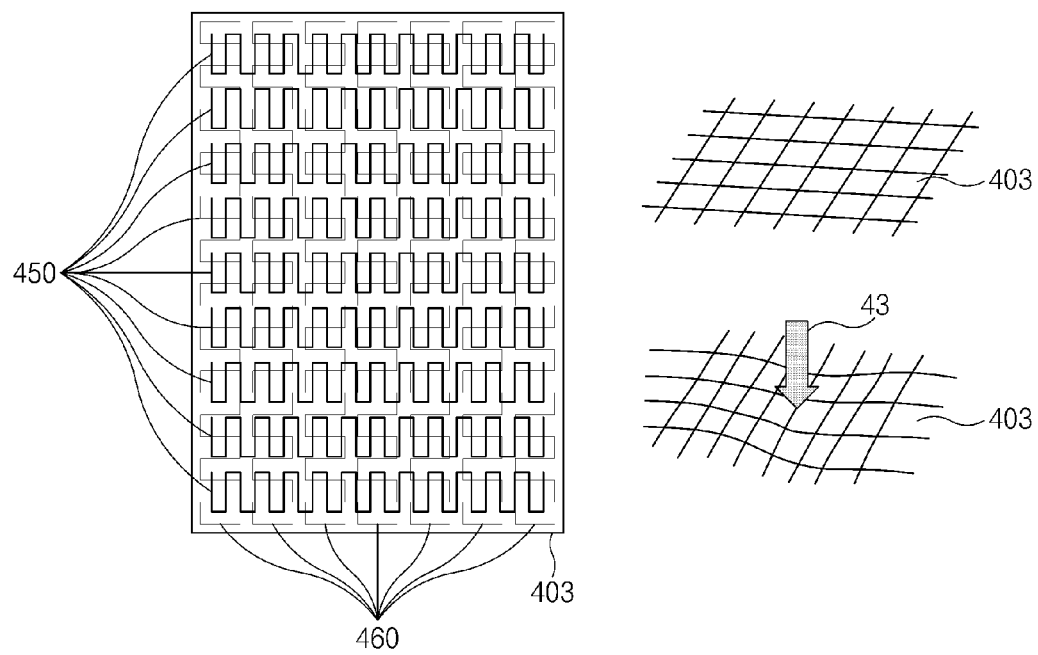

FIGS. 4A and 4B illustrate an operation of a second touch sensor, according to an embodiment of the present disclosure.

Referring to FIG. 4A, a second touch sensor 401 or 402 mountable in an electronic device is illustrated. Various types of resistive touch sensors may be used as the second touch sensor 401 or 402. However, it is assumed that the second touch sensor 401 or 402 is a touch sensor using a capacitance value.

According to an embodiment of the present disclosure, the second touch sensor 401 include a ground (GND) 410 and an electrode 420. The ground (GND) 410 may be positioned under the electrode 420 in a horizontal direction. The electrode 420 positioned in a vertical direction may form a lattice shape with the ground (GND) 410. In the second touch sensor 401, each of the electrode 420 and the ground (GND) 410 may be formed on a specified sheet with a conductive pattern having a strip shape. The conductive patterns of the respective sheets may face each other while crossing each other. A touch controller may measure capacitance between the electrode 420 and the ground (GND) 410 at a specified period. The second touch sensor 401 may be implemented with a flexible printed circuit board (FPCB).

According to an embodiment of the present disclosure, the second touch sensor 402 includes a ground (GND) 430 and an electrode 440. The ground (GND) 430 may have a size corresponding to a size of the electrode 440 and may be positioned under the electrode 440. The electrode 440 may form an array shape with the ground (GND) 430. In the second touch sensor 402, each of the electrode 440 and the ground (GND) 430 may be implemented with a conductive patch positioned on a specified sheet in an array shape. Conductive patches constituting the electrode 440 and the ground (GND) 430 may be respectively positioned on the sheets to face each other. A touch controller may measure capacitance between the electrode 440 and the ground (GND) 430 at a specified time period.

A user touch may not exist at an area C1, in which an m-th electrode 420-$m$ and an n-th ground (GND) 410-$n$ of the second touch sensor 401 cross each other, and at an area C2 corresponding to an electrode component 440($x, y$) and a ground (GND) component 430($x, y$) that are positioned at the x-th row and y-th column. Previously determined capacitance Ca may be formed in the area C1 and the area C2. The capacitance Ca may be sensed by the touch controller at a specified time period.

A user touch may be made at an area D1, in which a p-th electrode 420-$p$ and a q-th ground (GND) 410-$q$ of the second touch sensor 401 cross each other, and at an area D2 corresponding to an electrode component 440($i, j$) and a ground (GND) component 430($i, j$) that are positioned at the i-th row and j-th column. In this case, a partial area of a cover glass 403 on which a user touch 41 or 42 is made may finely press the second touch sensor 401 or 402. Accordingly, a distance between an electrode and a ground (GND) may finely decrease resulting in a capacitance increase from Ca to Ct (Ca<Ct). The touch controller may sense whether the touch 41 or 42 is made, based on sensing whether capacitance of the second touch sensor 401 or 402 increases from Ca to Ct.

In the second touch sensor 402 of FIG. 4A, the electrode 440 and the ground (GND) 420 may face each other in an array shape and may be included in different FPCBs. One layer of the FPCB may include a plurality of electrodes 440, and another layer may include a plurality of grounds (GND) 430. The electrode 440 may be included in a single-layer FPCB, and the ground (GND) 430 may be implemented with a single conductive plate and may be positioned adjacent to the single-layer FPCB. A spacer may be interposed between the FPCB and the conductive plate. In the case where the ground (GND) 430 is implemented with a single conductive plate, the ground (GND) 430 may be connected with an internal ground of an electronic device.

Referring to FIG. 4B, a second touch sensor 403 mountable in an electronic device is illustrated. It is assumed that the second touch sensor 403 is a touch sensor using a resistance value.

According to an embodiment of the present disclosure, the second touch sensor 403 includes a ground (GND) 450 and a conductive pattern 460. The ground (GND) 450 and the conductive pattern 460, each of which is arranged in a strain gage pattern, may be flexible. For example, each of the ground (GND) 450 and the conductive pattern 460 may be formed on an elastic sheet with a zig-zag pattern (e.g., a strain gage pattern). Each of a sheet on which the conductive pattern 460 is formed with a zig-zag pattern (e.g., a strain gage pattern) and a sheet on which the ground (GND) 450 is formed with a zig-zag pattern (e.g., a strain gage pattern) may be implemented with the FPCB.

If the ground (GND) 450 and the conductive pattern 460 are respectively formed on elastic sheets in the form of a strain gage pattern, the ground (GND) 450 and the conductive pattern 460 may also have elasticity. Accordingly, in the case where a touch 43 is made on the second touch sensor 403, a resistance value of a portion of the strain gage pattern which is physically expanded (or stretched) due to the pressure may vary, thereby making it possible to determine a location, a pressure intensity, a pressure distribution, of the touch 43.

A second touch sensor that senses a touch based on pressure is not limited to the embodiments shown in FIGS. 4A and 4B. A resistive touch sensor using a piezo film may also be used. The resistive touch sensor using the piezo film may sense a location and pressure of a touch from a voltage generated according to the pressure. According to an embodiment of the present disclosure, a spacer for securing a distance between two facing films of the piezo film may be interposed between the two facing films. The spacer may also be omitted. Since the resistive touch sensor using the piezo film is able to be implemented transparently, the resistive touch sensor may be used as the second touch sensors 230$b$ and 230$c$ of the electronic device 200$b$ and 200$c$ of FIG. 2.

A second touch sensor that senses a touch based on the pressure may be implemented with at least one module-type pressure sensor. The module-type pressure sensor may be at least positioned at four corners of a rear surface of a display to detect pressure intensity, a location to which pressure is applied, and the like. The second touch sensor that senses a touch based on pressure may not be limited to the shape and the driving mechanism as shown and described above.

Figure 5:
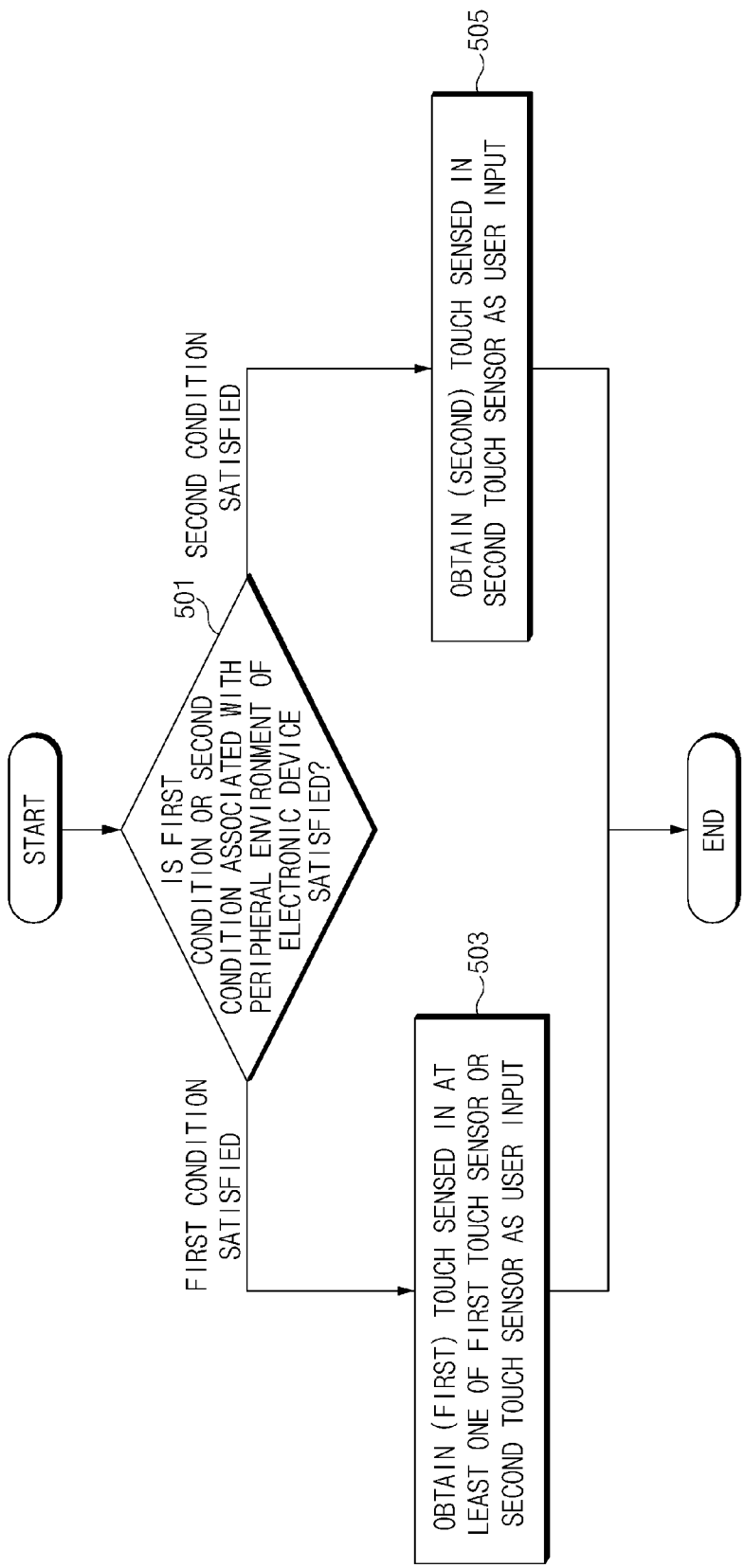
FIG. 5 is a flowchart of a touch input obtaining method, according to an embodiment of the present disclosure.

FIG. 5 is a flowchart of a touch input obtaining method, according to an embodiment of the present disclosure.

Referring to FIG. 5, the touch input obtaining method, according to an embodiment of the present disclosure, includes operation 501 to operation 505. Operation 501 to operation 505 may be performed by, for example, the electronic device 100 illustrated in FIG. 1. Each of operation 501 to operation 505 may be implemented with instructions performed (or executed) by the processor 160 of the electronic device 100. The instructions may be stored in, for example, the memory 150 of the electronic device 100. A description of FIG. 5 may be given using the reference numerals of FIG. 1.

In operation 501, the processor 160 of the electronic device 100 determines whether a first condition or a second condition associated with a surrounding environment of the electronic device 100 is satisfied. If the first condition is satisfied (it is determined that the electronic device 100 is in a first state), the process proceeds to operation 503 (e.g., a normal mode). If the second condition is satisfied (it is determined that the electronic device 100 is in a second state), the process may proceed to operation 505 (e.g., an underwater mode).

According to an embodiment of the present disclosure, the processor 160 may determine whether the first condition or the second condition is satisfied, based on a variation of a coupling voltage value of the first touch sensor 112. The processor 160 may determine whether the first condition or the second condition is satisfied, based on an impedance between a pair of the conductive patches 141 exposed to the outside of the electronic device 100. The processor 160 may determine whether the first condition or the second condition is satisfied, based on an impedance of a plurality of pairs of the conductive patches 141, 142, and 143 exposed to the outside of the electronic device 100.

If it is determined that the first condition is satisfied (it is determined that the electronic device 100 is in the first state), in operation 503, the processor 160 obtains a first touch sensed by at least one of the first touch sensor 112 or the second touch sensor 113 as a user input (the normal mode). In the first state, the processor 160 may obtain at least one of a location of the first touch sensed by the first touch sensor 112 or pressure of the first touch sensed by the second touch sensor 113 (e.g., a pressure sensor) as a user input. The processor 160 may obtain a touch input through any one or both of the first touch sensor 112 and the second touch sensor 113.

If it is determined that the second condition is satisfied (it is determined that the electronic device 100 is in the second state), in operation 505, the processor 160 obtains a second touch sensed by the second touch sensor 113 as a user input (the underwater mode). In the second state, the processor 160 may obtain at least one of a location of the second touch sensed by the second touch sensor 113 (e.g., a pressure sensor) or pressure of the second touch as a user input. In this case, the processor 160 may deactivate the first touch sensor 112 such that the second touch sensed from the first touch sensor 112 is not obtained as a user input.

According to an embodiment of the present disclosure, the electronic device 100 may control operations of the first touch sensor 112 and the second touch sensor 113, based on a condition associated with a surrounding environment of the electronic device 100. In the case where the electronic device 100 is in a normal environment (in the air), the electronic device 100 may sense a user touch through any one or both of the first touch sensor 112 and the second touch sensor 113. In the case where at least a portion of the electronic device 100 is in water, the electronic device 100 may sense a user touch using the second touch sensor 113. Accordingly, the user of the electronic device 100 may perform a touch input in water as well as in the air.

FIG. 6 illustrates how a condition associated with a surrounding environment of an electronic device is determined using a first touch sensor, according to an embodiment of the present disclosure.

According to an embodiment of the present disclosure, the processor 160 of the electronic device 100 illustrated in FIG. 1 may determine whether a first condition or a second condition is satisfied, based on a variation of a coupling voltage value of the first touch sensor 112.

If a coupling voltage that is greater than or equal to a first voltage value V1 is maintained in a first specified area (70% of the area of the first touch sensor 112) or more of the first touch sensor 112 during a first specified time or more (e.g., 2 seconds or more), the processor 160 may determine that the first condition is satisfied (the normal mode).

In contrast, if a coupling voltage that is less than a second voltage value V2 is maintained in a second specified area (30% of the area of the first touch sensor 112) or more of the first touch sensor 112 during a second specified time or more (e.g., 1 second or more), the processor 160 may determine that the second condition is satisfied. In this case, the second voltage value V2 may be set to be the same as, or less than, the first voltage value V1 (the underwater mode).

Referring to FIG. 6, a coupling voltage of a first touch sensor which varies according to an event associated with a surrounding environment of the electronic device 100 is illustrated.

In a time period from 0 to $t_1$, no touch is made on the electronic device 100. Since no touch is made, a coupling voltage of the first touch sensor 112 may be maintained at 1.0V in the time period from 0 to $t_1$. Since a coupling voltage that is greater than or equal to the first voltage value V1 is maintained in the first specified area or more of the first touch sensor 112 during the first specified time or more, the processor 160 of the electronic device 100 may determine that the first condition is satisfied.

In a time period from $t_1$ to $t_2$, the user may perform a touch-down (an example of a first touch) by touching a portion (e.g., a finger) of his/her body on the cover glass 111 of the display 110 of the electronic device 100. The coupling voltage of the first touch sensor 112 may decrease to 0.5V by the touch-down. The processor 160 of the electronic device 100 that determines that the first condition is satisfied may obtain the touch-down sensed by at least one of the first touch sensor 112 or the second touch sensor 113 as a user input.

At a time point $t_2$, the user may release the portion of his/her body which is in contact, from the cover glass 111 of the display 110 (touch release). The coupling voltage of the first touch sensor 112 may increase from 0.5V to 1.0V by the touch release.

In a time period from $t_2$ to $t_3$, no touch is made on the electronic device 100. Since no touch is made, the coupling voltage of the first touch sensor 112 may be maintained at 1.0V in the time period from $t_2$ to $t_3$.

In a time period from $t_3$ to $t_4$, a foreign material "X" may be attached on the cover glass 111 of the display 110 of the electronic device 100. The coupling voltage of the first touch sensor 112 may decrease to 0.8V by the foreign material "X". In this case, since the coupling voltage of the first touch sensor 112 is greater than or equal to the first voltage value V1, the processor 160 may determine that the first condition is satisfied.

At a time point $t_4$, the foreign material "X" may be removed from the cover glass 111 of the display 110 of the electronic device 100. Since the foreign material "X" is removed, the coupling voltage of the first touch sensor 112 may increase from 0.8V to 1.0V.

In a time period from $t_4$ to $t_5$, the user may not make any touch on the electronic device 100, and any foreign material may not be attached on the cover glass 111 of the electronic device 100. Accordingly, the coupling voltage of the first touch sensor 112 may be maintained at 1.0V in the time period from $t_4$ to $t_5$.

In a time period from $t_5$ to $t_6$, a foreign material "Y" may be attached on the cover glass 111 of the display 110 of the electronic device 100. The conductivity of the foreign material "Y" may be greater than that of the foreign material "X". Accordingly, if the foreign material "Y" is attached, the coupling voltage of the first touch sensor 112 may decrease to 0.3 V. In this case, since the coupling voltage of the first touch sensor 112 is less than the first voltage value V1 and is greater than or equal to the second voltage value V2, the processor 160 of the electronic device 100 may consider the previously satisfied condition as being continuously satisfied. That is, the processor 160 may continuously determine that the first condition is satisfied. Since the coupling voltage of the first touch sensor 112 decreased to 0.3V is less than 0.5V, attachment of the foreign material "Y" may be sensed as a touch.

At a time point $t_6$, the foreign material "Y" may be removed from the cover glass 111 of the display 110 of the electronic device 100. Since the foreign material "Y" is removed, the coupling voltage of the first touch sensor 112 may increase from 0.3V to 1.0V.

In a time period from $t_6$ to $t_7$, the user may not make a touch on the electronic device 100, and any foreign material may not be attached on the cover glass 111 of the electronic device 100. Accordingly, the coupling voltage of the first touch sensor 112 may be maintained at 1.0V in the time period from $t_6$ to $t_7$.

From a time point $t_7$, the electronic device 100 may be under water. For example, conductive water (e.g., tap water, seawater, and the like) may be surrounding the entire area of the cover glass 111 of the display 110 of the electronic device 100. If the water is surrounding the electronic device, the coupling voltage of the first touch sensor 112 may decrease to be less than the second voltage value V2 due to the conductivity of the water. The coupling voltage of the first touch sensor 112 may decrease to a value (e.g., 0.01V) close to "0".

If a coupling voltage that is less than the second voltage value V2 is maintained in the second specified area or more of the first touch sensor 112 during the second specified time or more (e.g., $\Delta t_{78}$), the processor 160 may determine that the second condition is satisfied. Since a coupling voltage value is maintained at a voltage (e.g., 0.01V) less than the second voltage value V2 during $\Delta t_{78}$ or more after the electronic device 100 is in water at the time point $t_7$, the processor 160 may determine that the second condition is satisfied, from a time point $t_8$. The processor 160 may obtain a second touch sensed by the second touch sensor 113 as a user input from the time point $t_8$.

In FIG. 6, the first voltage value V1 is set to be greater than or equal to the second voltage value V2. However, embodiments of the present disclosure are not limited thereto. The first voltage value V1 and the second voltage value V2 may have the same value.

According to an embodiment of the present disclosure, it may be possible to determine whether the first condition or the second condition is satisfied, based on a variation of a coupling voltage of a first touch sensor. Since a reference voltage value for determining the first condition or the second condition is divided into a plurality of voltage values such as the first voltage value V1 and the second voltage value V2, even though a foreign material is attached, it may be possible to determine a condition associated with a surrounding environment of the electronic device.

Figure 7:
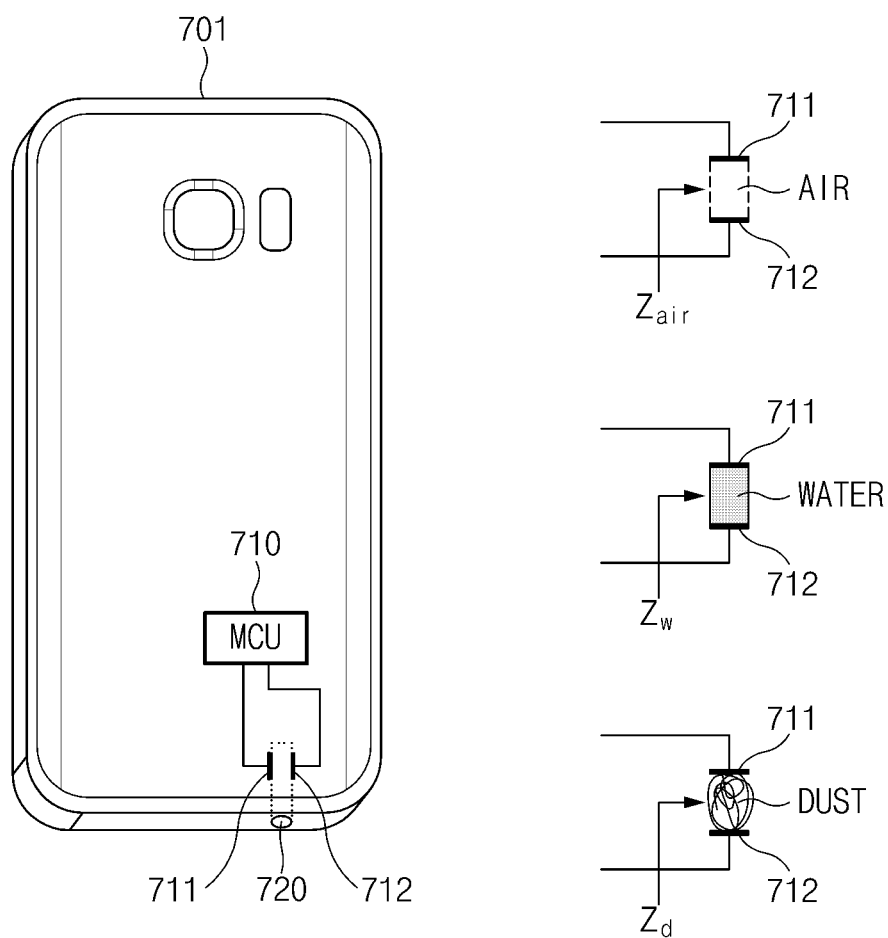
FIG. 7 illustrates how a condition associated with a surrounding environment of the electronic device is determined using a pair of conductive patches, according to an embodiment of the present disclosure.

FIG. 7 illustrates how a condition associated with a surrounding environment of an electronic device is determined using a pair of conductive patches, according to an embodiment of the present disclosure.

According to an embodiment of the present disclosure, the processor 160 of the electronic device 100 of FIG. 1 may determine whether the first condition or the second condition is satisfied, based on an impedance (or admittance) between a pair of the conductive patches 141 exposed to the outside of the electronic device 100. If impedance between the pair of the conductive patches 141 is greater than or equal to a first value, the processor 160 may determine that the first condition is satisfied (the normal mode). In contrast, if the impedance between the pair of conductive patches is less than a second value, the processor 160 may determine that the second condition is satisfied (the underwater mode).

Referring to FIG. 7, an electronic device 701 corresponding to the electronic device 100 of FIG. 1 is illustrated. According to an embodiment of the present disclosure, the electronic device 701 includes an MCU 710 and a pair of conductive patches 711 and 712 exposed to the outside of the electronic device 701.

The MCU 710 may be electrically connected with the pair of conductive patches 711 and 712. The MCU 710 may measure impedance between the pair of conductive patches 711 and 712 and may report the measured impedance to a processor. If the impedance information reported from the MCU 710 indicates that the impedance between the pair of conductive patches 711 and 712 is greater than or equal to a first value $Z_{threshold1}$, the processor may determine that the first condition is satisfied. If the impedance information reported from the MCU 710 indicates that the impedance between the pair of conductive patches 711 and 712 is less than a second value $Z_{threshold2}$, the processor may determine that the second condition is satisfied.

The pair of conductive patches 711 and 712 may be exposed to the outside of the electronic device 701. According to an embodiment of the present disclosure, the pair of conductive patches 711 and 712 may be positioned on a portion of an inside of a 3.5 mm audio output terminal 720. However, a location at which the pair of conductive patches 711 and 712 are positioned is not limited to the above description. The pair of conductive patches 711 and 712 may be positioned at a portion of a part, which is exposed to the outside, such as an audio output hole in which a speaker is positioned.

In general, air impedance $Z_{air}$ may be greater than dust (non-conductive) impedance $Z_d$, and the dust impedance may be greater than the impedance Zw of water (e.g., tap water or seawater) (i.e., $Z_{air} > Z_d > Zw$). In this case, the second value $Z_{threshold2}$ may be set to be smaller than the dust impedance $Z_d$ and greater than the impedance Zw of water (e.g., tap water or seawater) (i.e., $Z_d > Z_{threshold2} > Zw$). The first value $Z_{threshold1}$ may be set to be smaller than the air impedance $Z_{air}$ (i.e., $Z_{air} > Z_{threshold1}$). The second value $Z_{threshold2}$ may be set to be the same as or less than the first value $Z_{threshold1}$.

In the case where water flows in between the pair of conductive patches 711 and 712, the impedance between the pair of conductive patches 711 and 712 may be less than the second value $Z_{threshold2}$. Accordingly, the processor may determine that the second condition is satisfied. In the case where dust flows in between the pair of conductive patches 711 and 712, the impedance between the pair of conductive patches 711 and 712 may be higher the second value $Z_{threshold2}$. Accordingly, the processor may determine that the second condition is not satisfied (the first condition is satisfied).

According to an embodiment of the present disclosure, an electronic device may determine whether a first condition or a second condition is satisfied, based on an impedance (or admittance) between the pair of conductive patches having a relatively simple structure. Since a reference impedance value for determining the first condition or the second condition is divided into a plurality of values such as the first value $Z_{threshold1}$ and the second value $Z_{threshold2}$, even though dust is interposed between the pair of conductive patches, it may be possible to determine a condition associated with a surrounding environment of the electronic device.

Figure 8:
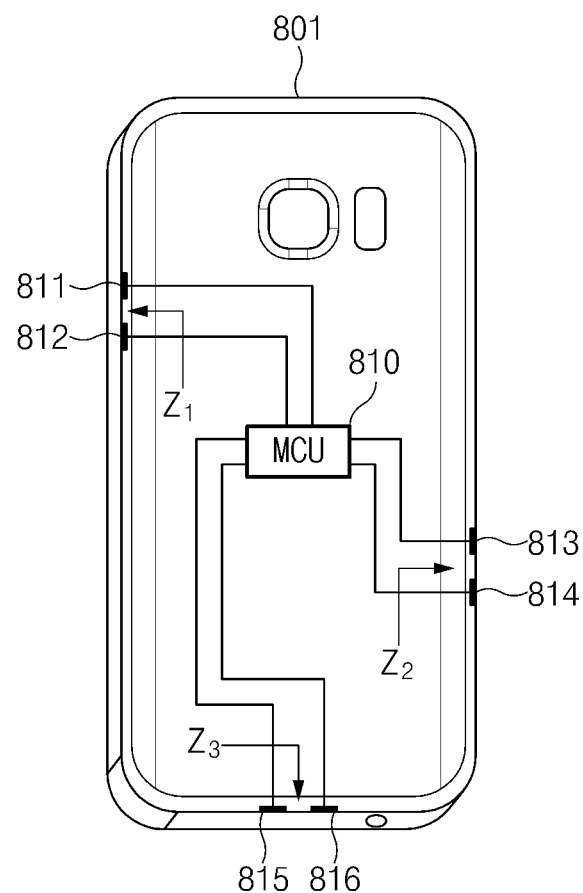
FIG. 8 illustrates how a condition associated with a surrounding environment of the electronic device is determined using a plurality of pairs of conductive patches, according to an embodiment of the present disclosure.

FIG. 8 illustrates how a condition associated with a surrounding environment of an electronic device is determined using a plurality of pairs of conductive patches.

According to an embodiment of the present disclosure, the processor 160 of the electronic device 100 of FIG. 1 may determine whether the first condition or the second condition is satisfied, based on an impedance (or admittance) of a plurality of pairs of the conductive patches 141, 142, and 143 exposed to the outside of the electronic device 100. If the impedance between at least one pair of conductive patches among the plurality of pairs of the conductive patches 141, 142, and 143) is greater than or equal to a specified value, the processor 160 may determine that the first condition is satisfied (the normal mode). In contrast, for example, if impedance of each of the plurality of pairs of the conductive patches 141, 142, and 143 is less than the specified value, the processor 160 may determine that the second condition is satisfied (the underwater mode).

Referring to FIG. 8, an electronic device 801 corresponding to the electronic device 100 of FIG. 1 is illustrated. According to an embodiment of the present disclosure, the electronic device 801 includes an MCU 810 and a plurality of pairs of conductive patches exposed to the outside of the electronic device 801. The plurality of pairs of conductive patches may include a (1-1)-th conductive patch 811, a (1-2)-th conductive patch 812, a (2-1)-th conductive patch 813, a (2-2)-th conductive patch 814, a (3-1)-th conductive patch 815, and a (3-2)-th conductive patch 816. The (1-1)-th conductive patch 811 and the (1-2)-th conductive patch 812 may constitute a first pair of conductive patches, the (2-1)-th conductive patch 813 and the (2-2)-th conductive patch 814 may constitute a second pair of conductive patches, and (3-1)-th conductive patch 815 and the (3-2)-th conductive patch 816 may constitute a third pair of conductive patches.

The MCU 810 may be electrically connected with the plurality of pairs of conductive patches 811 to 816. The MCU 810 may measure impedances Z1, Z2 and Z3 between the plurality of pairs of conductive patches 811 to 816 and may report the measured impedance to a processor. If the impedance information reported from the MCU 810 indicates that at least one of the impedances Z1, Z2 and Z3 of the plurality of pairs of conductive patches 811 to 816 is greater than or equal to a specified value $Z_{threshold}$, the processor may determine that the first condition is satisfied. In contrast, if each of the impedances Z1, Z2, and Z3 of the plurality of pairs of conductive patches 811 to 816 is less than the specified value, the processor may determine that the second condition is satisfied.

The plurality of pairs of conductive patches 811 to 816 may be exposed to the outside of the electronic device 801. According to an embodiment of the present disclosure, as illustrated in FIG. 8, the first pair of conductive patches 811 and 812 may be positioned on a surface of an upper end of one side surface of the electronic device 801. The second pair of conductive patches 813 and 814 may be positioned on a surface of a lower end of another side surface of the electronic device 801. Also, the third pair of conductive patches 815 and 816 may be positioned on a bottom side surface of the electronic device 801. However, locations at which the plurality of pairs of conductive patches 811 to 816 are positioned are not limited to the above description. The plurality of pairs of conductive patches 811 to 816 may be positioned on a surface of a physical key and/or a soft key in the electronic device 801.

The specified value $Z_{threshold}$ may be set to be greater than the impedance Zw of water (e.g., tap water or seawater) (i.e., $Z_{threshold}$>Zw). The specified value $Z_{threshold}$ may be divided and set into a plurality of specified values.

According to an embodiment of the present disclosure, only when each of the impedances of the plurality of pairs of conductive patches 811 to 816 is less than the specified value $Z_{threshold}$, the electronic device 801 may determine that the second condition is satisfied. Accordingly, in the case where only a portion of the electronic device 801 is in water or in the case where the user grips opposite side surfaces of the electronic device 801, the electronic device 801 may determine that the second condition is not satisfied.

Figure 9:
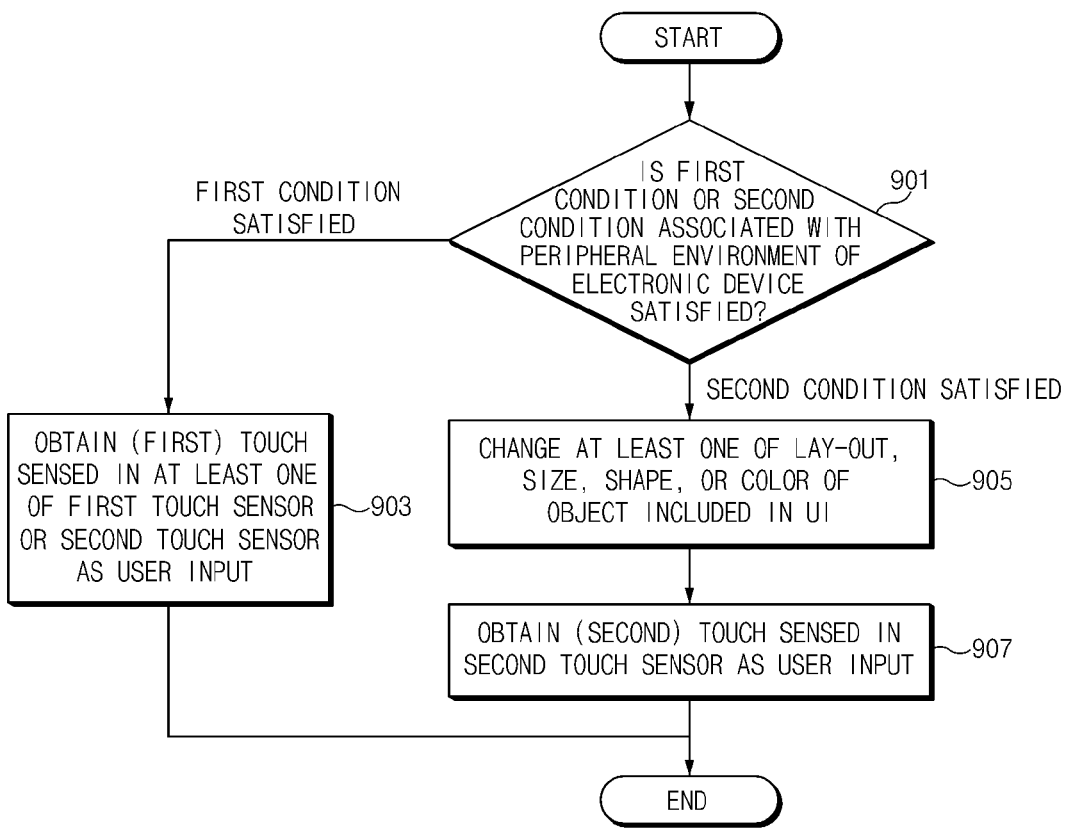
FIG. 9 is a flowchart illustrating a touch input obtaining method, according to another embodiment of the present disclosure.

FIG. 9 is a flowchart illustrating a touch input obtaining method, according to another embodiment of the present disclosure.

Referring to FIG. 9, the touch input obtaining method, according to an embodiment of the present disclosure, includes operation 901 to operation 907. Operation 901 to operation 907 may be performed by, for example, the electronic device 100 illustrated in FIG. 1. Each of operation 901 to operation 907 may be implemented with instructions performed (or executed) by the processor 160 of the electronic device 100. The instructions may be stored in, for example, the memory 150 of the electronic device 100. A description of FIG. 9 may be given using the reference numerals of FIG. 1. Also, operations 901, 903, and 907 correspond to operations 501, 503, and 505 of FIG. 5, and a duplicate description thereof is thus omitted.

Prior to operations 901 to 907, a (graphic) UI may be output by an OS or application of the electronic device 100 on the display panel 114 of the electronic device 100. At least one object may be included in the (graphic) UI.

If the second condition is satisfied as determined in operation 901, the electronic device 100 proceeds to perform operation 905.

In operation 905, the electronic device 100 changes at least one of a layout, a size, a shape, or a color of the at least one object.

According to an embodiment of the present disclosure, in operation 905, the processor 160 of the electronic device 100 may make brightness of the display panel 114 high. If the second condition is satisfied in operation 901, the processor 160 may output a pop-up message requesting execution of operations 905 and 907 on the display panel 114.

Figure 10:
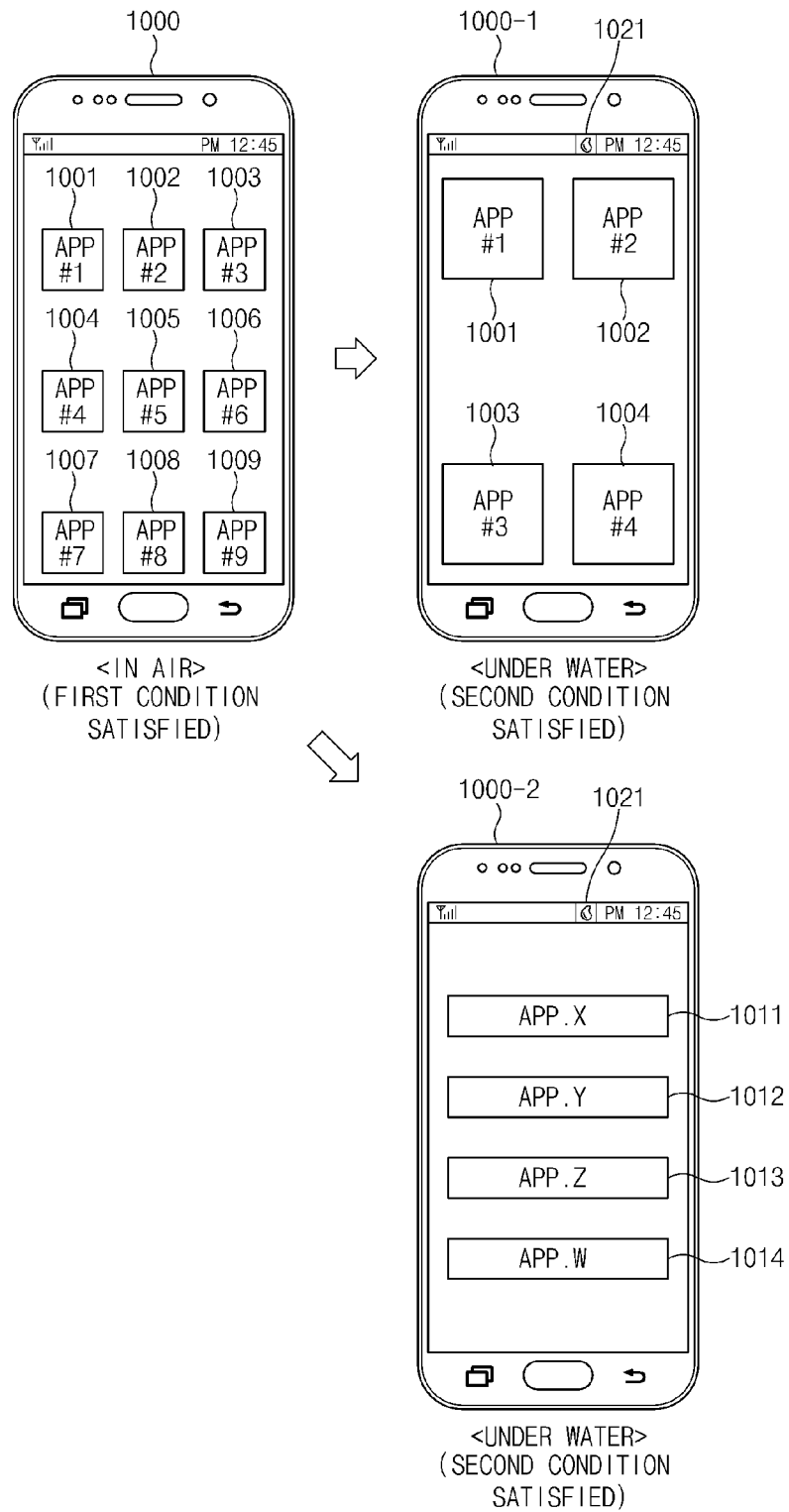
FIG. 10 illustrates screenshots describing a user interface (UI) change, according to an embodiment of the present disclosure.

FIG. 10 illustrates screenshots describing a UI change, according to an embodiment of the present disclosure.

Referring to FIG. 10, an electronic device 1000 that is placed in a surrounding environment (e.g., in the air) in which a first condition is satisfied and electronic devices 1001-1 and 1000-2 that are placed in a surrounding environment (e.g., underwater) in which a second condition is satisfied are illustrated. In the case where the electronic device 1000 is in water, the electronic device 1000 may output a specified UI on the display panel as shown the electronic device 1000-1 or the electronic device 1000-2

Icons 1001 to 1009 of a first application to a ninth application that configure UI may be output on the display of the electronic device 1000 placed in the surrounding environment (e.g., in the air) in which the first condition is satisfied. In other words, the electronic device 1000 may obtain a touch input from the user by using a first touch sensor and a second touch sensor.

In the case where at least a portion of the electronic device 1000 is in water, a processor of the electronic device 1000 may determine that the second condition is satisfied. If it is determined that the second condition is satisfied, the processor of the electronic device 1000 may obtain a touch input from the user by using the second touch sensor and may deactivate the first touch sensor. In this case, the electronic device 1000 may change a UI output on the display panel. An electronic device of which the UI is changed may be the electronic device 1000-1 or the electronic device 1000-2.

According to an embodiment of the present disclosure, if it is determined that the second condition is satisfied, a processor of the electronic device 1000-1 may output the icons 1001 to 1004, which correspond to the first application to the fourth application, from among the previously output icons 1001 to 1009 of the first application to the ninth application in one page. The icons 1005 to 1009 of the fifth application to the ninth application may be output in a separate page through left/right scrolling. Also, the processor may enlarge the sizes of the icons 1001 to 1004 of the first application to the fourth application and may move the icons 1001 to 1004 to corners of the display, respectively. Also, a symbol 1021 indicating "underwater" may be output in a status bar of the electronic device 1000-1.

The icons 1001 to 1004 of the first application to the fourth application may be displayed with a blue color series indicating "underwater" and may also increase the brightness of the display.

According to an embodiment of the present disclosure, if it is determined that the second condition is satisfied, a processor of the electronic device 1000-2 may output icons 1011 to 1014 of an application "X", an application "Y", an application "Z", or an application "W", which are the same as, or different from, the previously output icons 1011 to 1009 of the first application to the ninth application. The application "X", the application "Y", the application "Z", or the application "W" may correspond to an application that is useful for underwater activities. The application "X", the application "Y", the application "Z", or the application "W" may include a camera application, a lantern application, a compass application, an emergency call application, and the like.

Shapes of the icons 1011 to 1014 of the application "X", the application "Y", the application "Z", or the application "W" may be modified into a rectangular shape. The symbol 1021 indicating "underwater" may be output in a status bar of the electronic device 1000-2.

In FIG. 10, the icons 1011 to 1014 of the application "X", the application "Y", the application "Z", or the application "W" may be displayed with a blue color series indicating "underwater". Also, a background image of the electronic device 1002-2 may be changed to a specified image indicating "underwater", and the brightness of the display may also increase.

According to an embodiment of the present disclosure, if a second condition in which an electronic device operates in water is satisfied, it may be possible to change a UI output on a display in a form appropriate for underwater operation.

Figure 11:
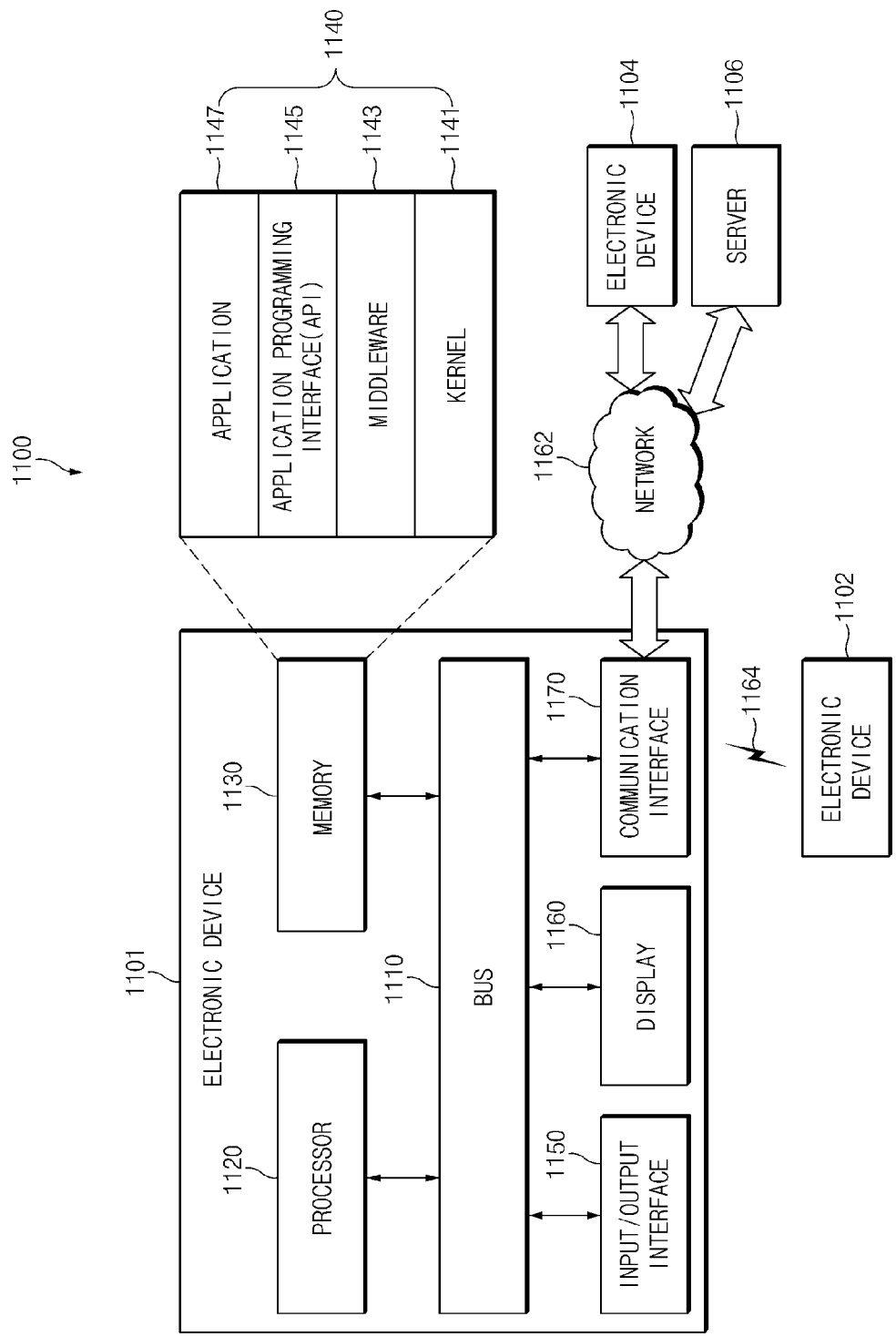
FIG. 11 is a block diagram of an electronic device, according to an embodiment of the present disclosure.

FIG. 11 is a block diagram of an electronic device in a network environment, according to an embodiment of the present disclosure.

Referring to FIG. 11, according to an embodiment of the present disclosure, an electronic device 1101, 1102 or 1104 or a server 1106 may be connected with each other over a network 1162 or a short range communication 1164. The electronic device 1101 includes a bus 1110, a processor 1120, a memory 1130, an input/output interface 1150, a display 1160, and a communication interface 1170. The electronic device 1101 may not include at least one of the above-described elements or may further include other element(s).

The bus 1110 may interconnect the above-described elements 1110 to 1170 and may include a circuit for conveying communications (e.g., a control message and/or data) among the above-described elements.

The processor 1120 may include one or more of a central processing unit (CPU), an application processor (AP), or a communication processor (CP). The processor 1120 may perform an arithmetic operation or data processing associated with control and/or communication of at least one other element(s) of the electronic device 1101.

The memory 1130 may include a volatile and/or nonvolatile memory. The memory 1130 may store instructions or data associated with at least one other element(s) of the electronic device 1101. According to an embodiment of the present disclosure, the memory 1130 stores software and/or a program 1140. The program 1140 includes, for example, a kernel 1141, a middleware 1143, an application programming interface (API) 1145, and/or an application program (or "an application") 1147. At least a part of the kernel 1141, the middleware 1143, or the API 1145 may be referred to as an operating system (OS).

The kernel 1141 may control or manage system resources (e.g., the bus 1110, the processor 1120, the memory 1130, and the like) that are used to execute operations or functions of other programs (e.g., the middleware 1143, the API 1145, and the application 1147). Furthermore, the kernel 1141 may provide an interface that allows the middleware 1143, the API 1145, or the application 1147 to access discrete elements of the electronic device 1101 so as to control or manage system resources.

The middleware 1143 may perform, for example, a mediation role such that the API 1145 or the application 1147 communicates with the kernel 1141 to exchange data.

Furthermore, the middleware 1143 may process one or more task requests received from the application 1147 according to a priority. The middleware 1143 may assign the priority, which makes it possible to use a system resource (e.g., the bus 1110, the processor 1120, the memory 1130, and the like) of the electronic device 1101, to at least one of the application 1147. The middleware 1143 may process the one or more task requests according to the priority assigned to the at least one, which makes it possible to perform scheduling or load balancing on the one or more task requests.

The API 1145 may be, for example, an interface through which the application 1147 controls a function provided by the kernel 1141 or the middleware 1143, and may include, for example, at least one interface or function (e.g., an instruction) for a file control, a window control, image processing, a character control, and the like.

The input/output interface 1150 may transmit an instruction or data input from a user or another external device, to other element(s) of the electronic device 1101. Furthermore, the input/output interface 1150 may output an instruction or data, received from other element(s) of the electronic device 1101, to a user or another external device.

The display 1160 may include, for example, a liquid crystal display (LCD), a light-emitting diode (LED) display, an organic LED (OLED) display, a microelectromechanical systems (MEMS) display, or an electronic paper display. The display 1160 may display, for example, various content (e.g., a text, an image, a video, an icon, a symbol, and the like) to a user. The display 1160 may include a touch screen and may receive, for example, a touch, gesture, proximity, or hovering input using an electronic pen or a part of a user's body.

The communication interface 1170 may establish communication between the electronic device 1101 and the first external electronic device 1102, the second external electronic device 1104 or the server 1106. The communication interface 1170 may be connected to the network 1162 over wireless communication or wired communication to communicate with the second external electronic device 1104 or the server 1106.

The wireless communication may include cellular communication employing at least one of, for example, long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), and the like, as cellular communication protocol. According to an embodiment of the present disclosure, the wireless communication may include, for example, at least one of wireless fidelity (Wi-Fi), Bluetooth™, near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 1101 may transfer the magnetic field signal to a point of sale (POS) terminal, and the POS terminal may detect the magnetic field signal using an MST reader. The POS terminal may recover the data by converting the detected magnetic field signal to an electrical signal.

The GNSS may include at least one of, for example, a global positioning system (GPS), a global navigation satellite system (Glonass), a Beidou navigation satellite system (Beidou), or the European global satellite-based navigation system (Galileo) based on an available region, a bandwidth, and the like. Hereinafter, in the present disclosure, the terms "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), and the like. The network 1162 may include at least one of telecommunications networks, for example, a computer network (e.g., LAN or WAN), an Internet, or a telephone network.

Each of the first and second external electronic devices 1102 and 1104 may be different from or the same as that of the electronic device 1101. According to an embodiment of the present disclosure, the server 1106 may include a group of one or more servers. All or a portion of operations performed in the electronic device 1101 may be executed by another or plural electronic devices (e.g., the electronic devices 1102 and 1104 or the server 1106). In the case where the electronic device 1101 executes any function or service automatically or in response to a request, the electronic device 1101 may not perform the function or the service internally, but, alternatively additionally, it may request at least a portion of a function associated with the electronic device 1101 from the electronic device 1102 or 1104 or the server 1106. The electronic device 1102 or 1104 or the server 1106 may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
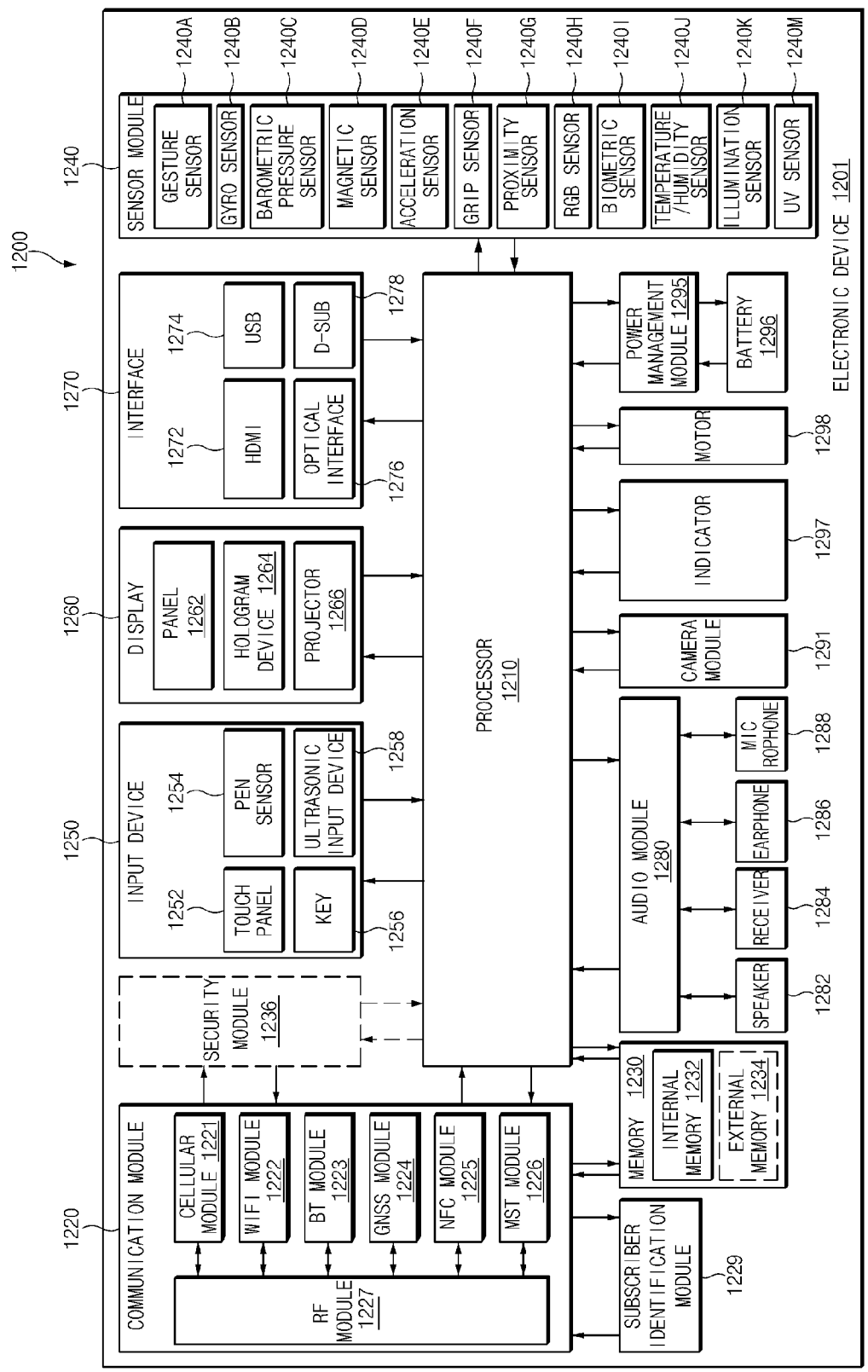
FIG. 12 is a block diagram of an electronic device, according to another embodiment of the present disclosure.

FIG. 12 illustrates a block diagram of an electronic device, according to another embodiment of the present disclosure.

Referring to FIG. 12, an electronic device 1201 includes, for example, an entire part or a part of the electronic device 1101 illustrated in FIG. 11. The electronic device 1201 includes one or more processors 1210, a communication module 1220, a subscriber identification module (SIM) 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may operate, for example, an operating system (OS) or an application to control a plurality of hardware or software elements connected to the processor 1210 and may process and compute a variety of data. The processor 1210 may be implemented with a system on chip (SoC). According to an embodiment of the present disclosure, the processor 1210 may further include a graphic processing unit (GPU) and/or an image signal processor. The processor 1210 may include at least a part (e.g., a cellular module 1221) of elements illustrated in FIG. 12. The processor 1210 may load an instruction or data, which is received from at least one of other elements (e.g., a nonvolatile memory), into a volatile memory and process the loaded instruction or data. The processor 1210 may store a variety of data in the nonvolatile memory.

The communication module 1220 may be configured the same as or similar to the communication interface 1170 of FIG. 11. The communication module 1220 may include the cellular module 1221, a Wi-Fi module 1222, a Bluetooth™ (BT) module 1223, a GNSS module 1224 (e.g., a GPS module, a Glonass module, a Beidou module, or a Galileo module), a near field communication (NFC) module 1225, an MST module 1226, and a radio frequency (RF) module 1227.

The cellular module 1221 may provide, for example, voice communication, video communication, a character service, an Internet service, and the like over a communication network. According to an embodiment of the present disclosure, the cellular module 1221 may perform discrimination and authentication of the electronic device 1201 within a communication network using the subscriber identification module (e.g., a SIM card) 1229. The cellular module 1221 may perform at least a portion of functions that the processor 1210 provides. The cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment of the present disclosure, at least a part (e.g., two or more) of the cellular module 1221, the Wi-Fi module 1222, the BT module 1223, the GNSS module 1224, the NFC module 1225, or the MST module 1226 may be included within one integrated circuit (IC) or an IC package.

The RF module 1227 may transmit and receive a communication signal (e.g., an RF signal). The RF module 1227 may include a transceiver, a power amplifier module (PAM), a frequency filter, a low noise amplifier (LNA), an antenna, and the like. According to an embodiment of the present disclosure, at least one of the cellular module 1221, the Wi-Fi module 1222, the BT module 1223, the GNSS module 1224, the NFC module 1225, or the MST module 1226 may transmit and receive an RF signal through a separate RF module.

The SIM 1229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1230 (e.g., the memory 1130) includes an internal memory 1232 and/or an external memory 1234. The internal memory 1232 may include at least one of a volatile memory (e.g., a dynamic random access memory (DRAM), a static RAM (SRAM), a synchronous DRAM (SDRAM), and the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), and the like), a hard drive, or a solid state drive (SSD). The external memory 1234 may further include a flash drive such as compact flash (CF), secure digital (SD), micro secure digital (micro-SD), mini secure digital (mini-SD), extreme digital (xD), a multimedia card (MMC), a memory stick, and the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. The security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. The security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. The sensor module 1240 includes at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. The sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. The electronic device 1201 may further include a processor that is a part of the processor 1210 or independent of the processor 1210 and is configured to control the sensor module 1240. The processor may control the sensor module 1240 while the processor 1210 is in a sleep state.

The input device 1250 includes, for example, a touch sensor 1252, a (digital) pen sensor 1254, a key 1256, or an ultrasonic input unit 1258. The touch sensor 1252 may use at least one of capacitive, resistive, infrared and ultrasonic detecting methods. Also, the touch sensor 1252 may further include a control circuit. The touch sensor 1252 may further include a tactile layer to provide a tactile reaction to a user.

The (digital) pen sensor 1254 may be, for example, a part of a touch sensor or may include an additional sheet for recognition. The key 1256 may include, for example, a physical button, an optical key, or a keypad. The ultrasonic input device 1258 may detect (or sense) an ultrasonic signal, which is generated from an input device, through a microphone 1288 and may check data corresponding to the detected ultrasonic signal.

The display 1260 includes a panel 1262, a hologram device 1264, or a projector 1266. The panel 1262 may be the same as or similar to the display 1160 illustrated in FIG. 11. The panel 1262 may be implemented, for example, to be flexible, transparent or wearable. The panel 1262 and the touch sensor 1252 may be integrated into a single module. The hologram device 1264 may display a stereoscopic image in a space using a light interference phenomenon. The projector 1266 may project light onto a screen so as to display an image. The screen may be arranged in the inside or the outside of the electronic device 1201. According to an embodiment of the present disclosure, the panel 1262 may include a pressure sensor that measures the intensity of touch pressure by a user. The pressure sensor may be implemented integrally with the touch sensor 1252, or may be implemented as at least one sensor separately from the touch sensor 1252. The display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11. The interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a part of the audio module 1280 may be included, for example, in the input/output interface 1150 illustrated in FIG. 11. The audio module 1280 may process, for example, sound information that is input or output through a speaker 1282, a receiver 1284, an earphone 1286, or the microphone 1288.

The camera module 1291 may capture a still image or a video. According to an embodiment of the present disclosure, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment of the present disclosure, a power management integrated circuit (PMIC), a charger IC, or a battery gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, and the like. The battery gauge may measure, for example, a remaining charge capacity of the battery 1296 and a voltage, current or temperature thereof while the battery is charged. The battery 1296 may include, for example, a rechargeable battery and/or a solar battery.

The indicator 1297 may display a specified state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFlo™, and the like.

Each of the above-mentioned elements of the electronic device, according to an embodiment of the present disclosure, may be configured with one or more components, and the names of the elements may be changed according to the type of electronic device. The electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

Figure 13:
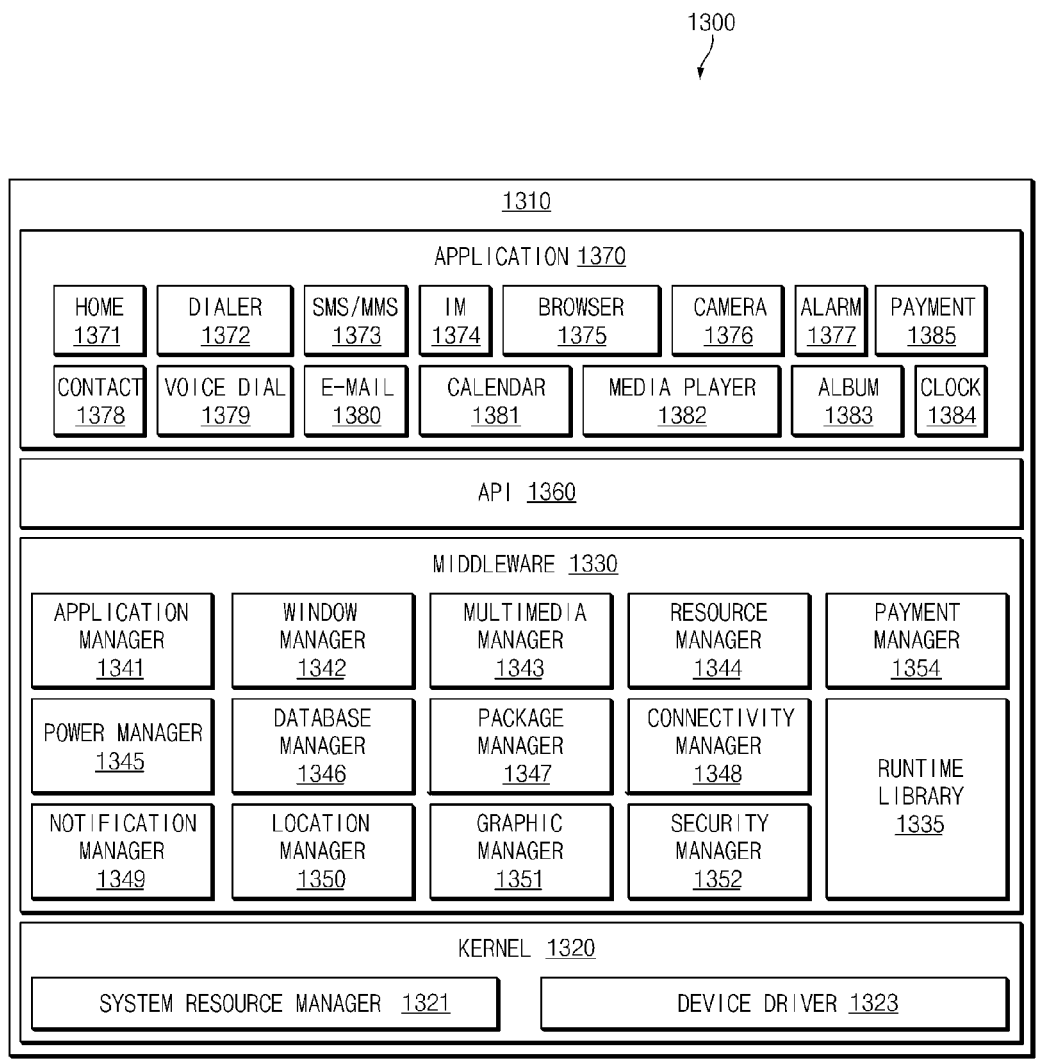
FIG. 13 is a block diagram of a program module, according to an embodiment of the present disclosure.

FIG. 13 illustrates a block diagram of a program module, according to an embodiment of the present disclosure.

According to an embodiment of the present disclosure, a program module 1310 (e.g., the program 1140) may include an operating system (OS) to control resources associated with an electronic device 1101, and/or diverse applications (e.g., the application program 1147) driven on the OS. The OS may be, for example, Android™, iOS™ Windows™, Symbian™, Tizen™, or Bada™.

The program module 1310 includes a kernel 1320, a middleware 1330, an application programming interface (API) 1360, and/or an application 1370. At least a portion of the program module 1310 may be preloaded on an electronic device or may be downloadable from the electronic device 1102 or 1104, the server 1106, and the like.

The kernel 1320 includes, for example, a system resource manager 1321 or a device driver 1323. The system resource manager 1321 may control, allocate, or retrieve system resources. According to an embodiment of the present disclosure, the system resource manager 1321 may include a process managing unit, a memory managing unit, a file system managing unit, and the like. The device driver 1323 may include, for example, a display driver, a camera driver, a Bluetooth™ driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment of the present disclosure, the middleware 1330 includes at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth™. The notification manager 1349 may display or notify an event such as an arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, and the like. According to an embodiment of the present disclosure, in the case where an electronic device 1101 includes a telephony function, the middleware 1330 may further include a telephony manager for managing a voice or video call function of the electronic device.

The middleware 1330 may include a middleware module that combines diverse functions of the above-described elements. The middleware 1330 may provide a module specialized to each OS kind to provide differentiated functions. Additionally, the middleware 1330 may dynamically remove a part of the preexisting elements or may add new elements thereto.

The API 1360 may be, for example, a set of programming functions and may be provided with a configuration that is variable depending on an OS. In the case where an OS is Android™ or iOS™, it may provide one API set per platform. In the case where an OS is the Tizen™, it may provide two or more API sets per platform.

The application 1370 includes, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a timepiece 1384, a payment 1385, health care (e.g., measuring an exercise quantity, blood sugar level, and the like) or environment information (e.g., information of barometric pressure, humidity, temperature, and the like).

According to an embodiment of the present disclosure, the application 1370 may include an information exchanging application to support information exchange between the electronic device 1101 and the electronic device 1102 or 1104. The information exchanging application may include, for example, a notification relay application for transmitting specified information to the external electronic device, or a device management application for managing the external electronic device.

The notification relay application may include a function of transmitting notification information, which arise from other applications (e.g., applications for SMS/MMS, e-mail, health care, or environmental information), to the electronic device 1102 or 1104. Additionally, the information exchanging application may receive, for example, notification information from the external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the electronic device 1102 or 1104 which communicates with the electronic device, an application running in the external electronic device, or a service (e.g., a call service, a message service, and the like) provided from the external electronic device.

According to an embodiment of the present disclosure, the application 1370 may include a health care application of a mobile medical device that is assigned in accordance with an attribute of the electronic device 1102 or 1104. According to an embodiment of the present disclosure, the application 1370 may include an application that is received from the server 1106 or the electronic device 1102 or 1104. The application 1370 may include a preloaded application or a third party application that is downloadable from a server. The names of elements of the program module 1310 may be modifiable depending on kinds of operating systems.

According to an embodiment of the present disclosure, at least a portion of the program module 1310 may be implemented by software, firmware, hardware, or a combination of two or more thereof. At least a portion of the program module 1310 may be implemented (e.g., executed), for example, by the processor 1210. At least a portion of the program module 1310 may include, for example, modules, programs, routines, sets of instructions, processes, and the like for performing one or more functions.

An electronic device, according to an embodiment of the present disclosure, includes a touch sensor, a pressure sensor, and a processor electrically connected with the touch sensor and the pressure sensor. The processor is configured to obtain at least one of a location of a first touch sensed by the touch sensor or pressure of the first touch sensed by the pressure sensor as a user input in a first state and to obtain at least one of a location of a second touch sensed by the pressure sensor or pressure of the second touch as a user input in a second state.

In an electronic device, according to an embodiment of the present disclosure, the touch sensor is configured to sense the first touch based on a coupling voltage between a transmitter and a receiver, and if the coupling voltage is greater than or equal to a first voltage value in a first specified area or more of the touch sensor during a first specified time or more, the processor may determine that the first state is satisfied.

In an electronic device, according to an embodiment of the present disclosure, if the coupling voltage is less than a second voltage value in a second specified area or more of the touch sensor during a second specified time or more, the processor determines that the second state is satisfied. The second voltage value may be set to be the same as or less than the first voltage value.

An electronic device, according to an embodiment of the present disclosure, further includes a pair of conductive patches exposed to an outside. If an impedance between the pair of conductive patches is greater than or equal to a first value, the processor determines that the first state is satisfied. If the impedance between the pair of conductive patches is less than a second value, the processor determines that the second state is satisfied, and the second value may be set to be the same as or less than the first value.

An electronic device, according to an embodiment of the present disclosure, further includes a plurality of pairs of conductive patches exposed to an outside. If an impedance between at least one pair of conductive patches among the plurality of pairs of conductive patches is greater than or equal to a specified value, the processor determines that the first state is satisfied. If impedance of each of the plurality of pairs of conductive patches is less than the specified value, the processor determines that the second state is satisfied.

In an embodiment of the present disclosure, the touch sensor may include a capacitive touch sensor.

In an embodiment of the present disclosure, the electronic device further includes a display panel configured to output a user interface (UI) including at least one object. The processor is configured to change at least one of a layout, a size, a shape, or a color of the at least one object, if the second state is satisfied.

In an electronic device, according to an embodiment of the present disclosure, the processor is configured to increase brightness of the display panel if the second state is satisfied.

An electronic device, according to an embodiment of the present disclosure, includes a first touch sensor, a second touch sensor, and a processor electrically connected with the first touch sensor and the second touch sensor. The processor is configured to determine whether a first condition or a second condition associated with a surrounding environment of the electronic device is satisfied, obtain a first touch sensed by at least one of the first touch sensor or the second touch sensor as a user input if it is determined that the first condition is satisfied, and obtain a second touch sensed by the second touch sensor as the user input if it is determined that the second condition is satisfied.

In an electronic device, according to an embodiment of the present disclosure, the first touch sensor is configured to sense the first touch based on a coupling voltage between a transmitter and a receiver.

In an electronic device, according to an embodiment of the present disclosure, the second touch sensor is configured to sense the first touch or the second touch based on a variation in pressure applied to the second touch sensor.

In an electronic device, according to an embodiment of the present disclosure, the second touch sensor has an area corresponding to an area of the first touch sensor or an area smaller than an area of the first touch sensor. The second touch sensor is positioned at an upper end or a lower end of the first touch sensor.

In an electronic device, according to an embodiment of the present disclosure, the first touch sensor is configured to sense the first touch based on a coupling voltage between a transmitter and a receiver, and if the coupling voltage is greater than or equal to a first voltage value in a first specified area or more of the first touch sensor during a first specified time or more, the processor determines that the first condition is satisfied.

In an electronic device, according to an embodiment of the present disclosure, if the coupling voltage is less than a second voltage value in a second specified area or more of the first touch sensor during a second specified time or more, the processor determines that the second condition is satisfied. The second voltage value may be set to be the same as or less than the first voltage value.

In an electronic device, according to an embodiment of the present disclosure, the electronic device further includes a pair of conductive patches exposed to an outside. If impedance between the pair of conductive patches is greater than or equal to a first value, the processor determines that the first condition is satisfied.

In an electronic device, according to an embodiment of the present disclosure, if the impedance between the pair of conductive patches is less than a second value, the processor determines that the second condition is satisfied, and the second value may be set to be the same as or less than the first value.

In an electronic device, according to an embodiment of the present disclosure, the electronic device further includes a plurality of pairs of conductive patches exposed to an outside. If impedance between at least one pair of conductive patches among the plurality of pairs of conductive patches is greater than or equal to a specified value, the processor determines that the first condition is satisfied.

In an electronic device, according to an embodiment of the present disclosure, if impedance of each of the plurality of pairs of conductive patches is less than the specified value, the processor determines that the second condition is satisfied.

In an electronic device, according to an embodiment of the present disclosure, the electronic device further includes a display panel configured to output a user interface (UI) including at least one object. The processor is configured to change at least one of a layout, a size, a shape, or a color of the at least one object, if the second condition is satisfied.

In an electronic device, according to an embodiment of the present disclosure, the processor is configured to increase brightness of the display panel if the second condition is satisfied.

A touch input obtaining method of an electronic device, according to an embodiment of the present disclosure, includes determining whether a first condition or a second condition associated with a surrounding environment of the electronic device is satisfied, obtaining a first touch sensed by at least one of a first touch sensor or a second touch sensor as a user input if it is determined that the first condition is satisfied, and obtaining a second touch sensed by the second touch sensor as the user input if it is determined that the second condition is satisfied.

In the touch input obtaining method, according to an embodiment of the present disclosure, the first touch sensor is configured to sense the first touch based on a coupling voltage between a transmitter and a receiver. The determining includes determining that the first condition is satisfied if the coupling voltage is greater than or equal to a first voltage value in a first specified area or more of the first touch sensor during a first specified time or more.

In the touch input obtaining method, according to an embodiment of the present disclosure, the determining includes determining that the second condition is satisfied, if the coupling voltage is less than a second voltage value in a second specified area or more of the first touch sensor during a second specified time or more. In this case, the second voltage value may be set to be the same as or less than the first voltage value.

In the touch input obtaining method, according to an embodiment of the present disclosure, the electronic device further includes a pair of conductive patches exposed to an outside. The determining includes determining that the first condition is satisfied if impedance between the pair of conductive patches is greater than or equal to a first value.

In the touch input obtaining method, according to an embodiment of the present disclosure, the determining further includes determining that the second condition is satisfied if the impedance between the pair of conductive patches is less than a second value. The second value may be set to be the same as or less than the first value.

In the touch input obtaining method, according to an embodiment of the present disclosure, the electronic device further includes a plurality of pairs of conductive patches exposed to an outside. The determining includes determining that the first condition is satisfied, if impedance between at least one pair of conductive patches among the plurality of pairs of conductive patches is greater than or equal to a specified value, and determining that the second condition is satisfied, if impedance of each of the plurality of pairs of conductive patches is less than the specified value.

In the touch input obtaining method, according to an embodiment of the present disclosure, the electronic device further includes a display panel configured to output a UI including at least one object. The touch input obtaining method further includes changing at least one of a layout, a size, a shape, or a color of the at least one object, if the second condition is satisfied.

According to an embodiment of the present disclosure, a computer-readable recording medium storing an instruction that, when executed by at least one processor, causes the at least one processor to perform operations of determining whether a first condition or a second condition associated with a surrounding environment of the electronic device is satisfied, obtaining a first touch sensed by at least one of a first touch sensor or a second touch sensor as a user input if it is determined that the first condition is satisfied, and obtaining a second touch sensed by the second touch sensor as the user input if it is determined that the second condition is satisfied.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. The "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations), according to an embodiment of the present disclosure, may be, for example, implemented by instructions stored in a computer-readable storage medium in the form of a program module. The instruction, when executed by a processor 1120, may cause the one or more processors to perform a function corresponding to the instruction. The computer-readable storage medium, for example, may be the memory 1130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

According to an embodiment of the present disclosure, an electronic device controls operations of a first touch sensor and a second touch sensor, based on a condition associated with a surrounding environment of the electronic device. In the case where the electronic device is in a normal environment (in the air), the electronic device may sense a user touch through at least one of the first touch sensor and the second touch sensor. Also, in the case where at least a portion of the electronic device is in water, the electronic device may sense a user touch using the second touch sensor. Accordingly, the user of the electronic device 100 may perform a touch input in water as well as in the air.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch sensor;
   a pressure sensor; and
   a processor electrically connected with the touch sensor and the pressure sensor, wherein the processor is configured to:
   determine whether a condition associated with a surrounding environment of the electronic device is a first condition or a second condition, based on a touch applied to the touch sensor being inputted in at least a specified area of the touch sensor during at least a specified time,
   select at least one of the touch sensor or the pressure sensor based on the condition being the first condition, and obtain at least one of a first location of the touch or first pressure of the touch as a user input, wherein the first location of the touch is sensed by the touch sensor and the first pressure of the touch is sensed by the pressure sensor in the first condition associated with the surrounding environment of the electronic device; and
   select the pressure sensor based on the condition being the second condition, and obtaining at least one of a second location of the touch or second pressure of the touch as a user input, wherein the second location and the second pressure are sensed by the pressure sensor in the second condition associated with the surrounding environment of the electronic device.

2. The electronic device of claim 1, wherein the touch sensor is configured to sense the touch based on a coupling voltage between a transmitter and a receiver, and wherein, if the coupling voltage is greater than or equal to a first voltage value in at least a first specified area of the touch sensor during at least a first specified time, the processor is further configured to determine that the first condition is satisfied.

3. The electronic device of claim 2, wherein if the coupling voltage is less than a second voltage value in at least a second specified area of the touch sensor during at least a second specified time, the processor is further configured to determine that the second condition is satisfied, and
   wherein the second voltage value is set to be the same as or less than the first voltage value.

4. The electronic device of claim 1, wherein the touch sensor includes a capacitive touch sensor.

5. The electronic device of claim 1, further comprising:
   a display panel configured to output a user interface (UI) including at least one object,
   wherein the processor is further configured to change at least one of a layout, a size, a shape, and a color of the at least one object, if the second condition is satisfied.

6. The electronic device of claim 5, wherein the processor is further configured to increase a brightness of the display panel if the second condition is satisfied.

7. An electronic device comprising:
   a first touch sensor;
   a second touch sensor; and
   a processor electrically connected with the first touch sensor and the second touch sensor,
   wherein the processor is configured to:
   determine whether a condition associated with a surrounding environment of the electronic device is a first condition or a second condition, based on a touch applied to the first touch sensor being inputted in at least a specified area of the first touch sensor during at least a specified time,
   select at least one of the first touch sensor or the second touch sensor based on the condition being the first condition, and obtain the touch sensed by the selected at least one of the first touch sensor or the second touch sensor as a user input, and
   select the second touch sensor based on the condition being the second condition, and obtain the touch sensed by the second touch sensor as the user input.

8. The electronic device of claim 7, wherein the first touch sensor is configured to sense the touch based on a coupling voltage between a transmitter and a receiver.

9. The electronic device of claim 7, wherein the second touch sensor is configured to sense the touch based on a variation in pressure applied to the second touch sensor.

10. A touch input obtaining method of an electronic device, the method comprising:
    determining whether a condition with a surrounding environment of the electronic device is a first condition or a second condition, based on a touch applied to a touch sensor being inputted in at least a specified area of the touch sensor during at least a specified time;
    selecting at least one of the touch sensor or a pressure sensor based on the condition being the first condition, and obtaining the touch sensed by the selected at least one of the touch sensor or the pressure sensor as a user input; and
    selecting the pressure sensor based on the condition being the second condition, and obtaining the touch sensed by the pressure sensor as the user input.

11. The method of claim 10, wherein the touch sensor is configured to sense the touch based on a coupling voltage between a transmitter and a receiver, and wherein determining whether the condition associated with the surrounding environment of the electronic device is the first condition or the second condition, based on the touch applied to the touch sensor being inputted in at least the specified area of the touch sensor during at least the specified time includes:

if the coupling voltage is greater than or equal to a first voltage value in at least a first specified area of the touch sensor during at least a first specified time, determining that the first condition is satisfied.

12. The method of claim 11, wherein determining whether the condition associated with the surrounding environment of the electronic device is the first condition or the second condition, based on the touch applied to the touch sensor being inputted in at least the specified area of the touch sensor during at least the specified time includes:

if the coupling voltage is less than a second voltage value in at least a second specified area of the touch sensor during at least a second specified time, determining that the second condition is satisfied, and wherein the second voltage value is the same as or less than the first voltage value.

13. The method of claim 10, wherein the electronic device comprises a display panel configured to output a user interface (UI) including at least one object, and further comprising:

changing at least one of a layout, a size, a shape, and a color of the at least one object, if the second condition is satisfied.

* * * * *